United States Patent [19]

Nomura et al.

[11] Patent Number: 5,155,797
[45] Date of Patent: Oct. 13, 1992

[54] CONTROL SYSTEM FOR CONTROLLING REVOLUTION SPEED OF ELECTRIC MOTOR

[75] Inventors: Masakatsu Nomura, Kanagawa; Tadashi Ashikaga; Michitaka Hori, both of Tokyo; Takayuki Mizuno; Tadashi Ichioka, both of Aichi, all of Japan

[73] Assignee: Kabushiki Kaisha Meidensha, Tokyo, Japan

[21] Appl. No.: 322,250

[22] Filed: Mar. 10, 1989

Related U.S. Application Data

[63] Continuation-in-part of Ser. No. 241,342, Sep. 7, 1988, abandoned.

[30] Foreign Application Priority Data

| Sep. 8, 1987 | [JP] | Japan | 62-224500 |
| Sep. 10, 1987 | [JP] | Japan | 62-227035 |
| Oct. 19, 1987 | [JP] | Japan | 62-263167 |
| Oct. 19, 1987 | [JP] | Japan | 62-263168 |
| Mar. 11, 1988 | [JP] | Japan | 63-58000 |
| Jun. 24, 1988 | [JP] | Japan | 63-83724 |
| Oct. 4, 1988 | [JP] | Japan | 63-250509 |

[51] Int. Cl.$^5$ .............................. H02P 5/00
[52] U.S. Cl. .................... 388/815; 388/902; 318/799; 318/801
[58] Field of Search ........ 388/930, 800–802, 388/806, 809–810, 805, 902; 318/727, 729, 738, 52, 798, 799–805

[56] References Cited

U.S. PATENT DOCUMENTS

| 4,322,668 | 3/1982 | Trussler et al. | 388/815 X |
| 4,378,517 | 3/1983 | Morton et al. | 388/802 |
| 4,441,061 | 4/1984 | Yoshida et al. | 388/815 X |
| 4,484,117 | 11/1984 | Bose | 388/802 |
| 4,691,150 | 10/1987 | Jen | 388/815 X |
| 4,698,003 | 3/1987 | Braitinger et al. | 388/815 |

FOREIGN PATENT DOCUMENTS

| 0121792 | 4/1984 | European Pat. Off. |
| 0175154 | 7/1986 | European Pat. Off. |
| 0196417 | 10/1986 | European Pat. Off. |

OTHER PUBLICATIONS

Conference Record of the 1986 IEEE Industry Applications Society Annual Meeting. Synthesis of a State Variable Motion Controller for High Performance Field Oriented Induction Machine Drives.

Primary Examiner—William M. Shoop, Jr.
Assistant Examiner—David Martin
Attorney, Agent, or Firm—Bachman & LaPointe

[57] ABSTRACT

A motor speed control system takes one approach to establish dummy load models having characteristics equivalent to an electric motor to be controlled. One of the dummy load models is established for feedback controlling the electric motor on the basis of the speed of the dummy model. The dummy model is divided into first and second models. The first model is designed to have equivalent characteristics to output a first motor speed representative data. The current to supply to the first model is so adjusted as to reduce a difference between the motor speed representative data and a desired motor speed data to zero. A frequency signal is added to the current applied to the first model and supplied to the electric motor to drive the latter. The second model receives the frequency signal to output a frequency signal dependent second motor speed representative value. Sum of the first and second motor speed representative value is compared with a measured motor speed indicative value to derive a speed difference compensation value based on the error therebetween. Based on the speed difference between the sum value and the measured motor speed and the frequency signal, inertia condition on the motor is assumed for controlling transfer characteristics so that the inertia condition in the first model becomes coincident with that of the motor.

17 Claims, 18 Drawing Sheets

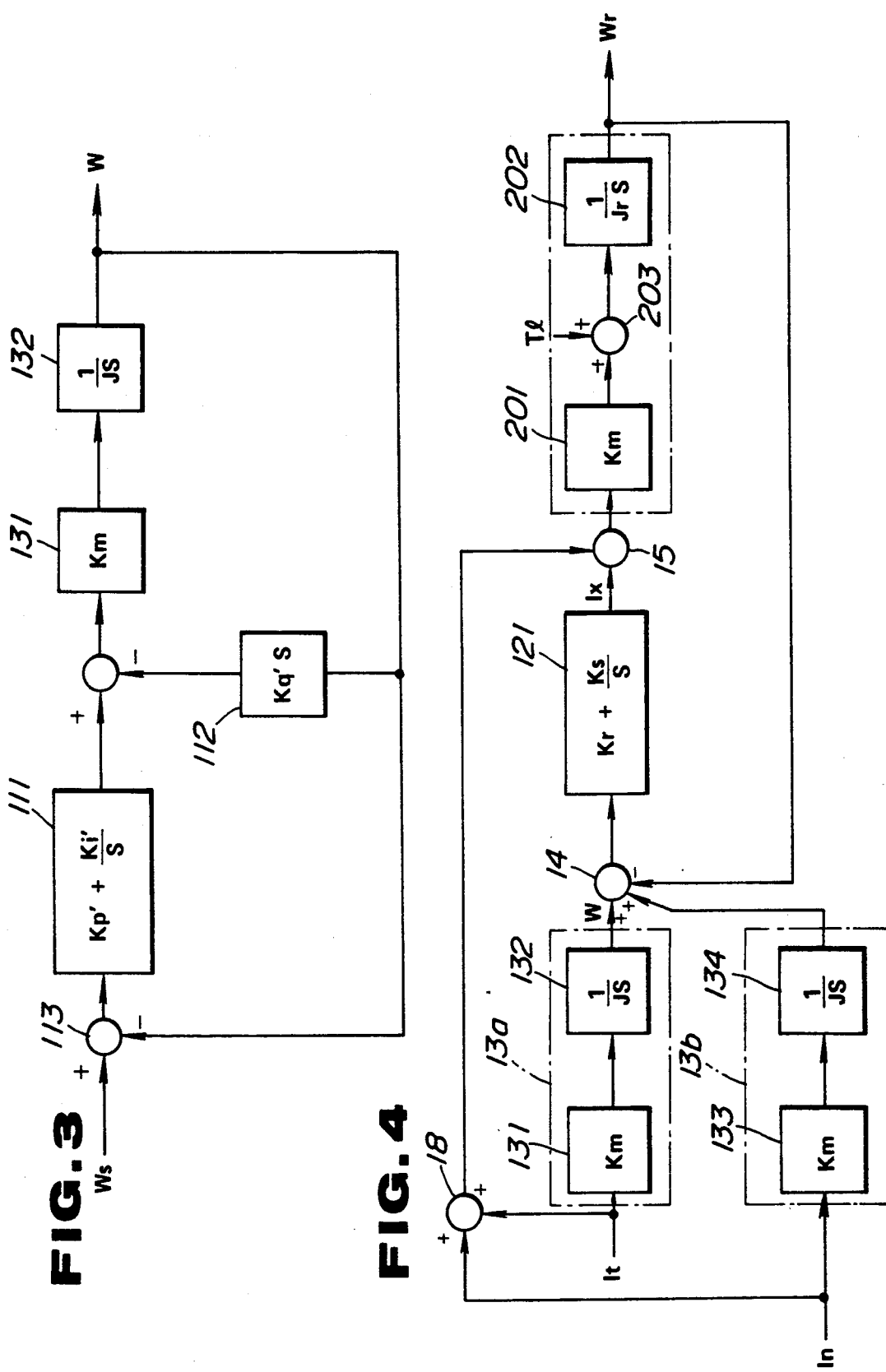

CONTROL SYSTEM FOR CONTROLLING REVOLUTION SPEED OF ELECTRIC MOTOR

CROSS REFERENCE TO THE COPENDING RELATED APPLICATION

The present invention is a continuation-in-part application of U.S. patent application Ser. No. 241,342, filed on Sep. 7, 1988, which has now been abandoned.

BACKGROUND OF THE INVENTION

1. Field of the Invention

The present invention relates generally to a control system for controlling revolution speed of an electric motor, such as an induction motor. More specifically, the invention relates to a motor speed control system with improved precision in speed control by compensating error factors which may otherwise cause error is motor speed control.

2. Description of the Background Art

As is well known, variable speed electric motors have been applied in various facilities, such as an elevator car drive system and so forth. In case that the electric motor, such as an induction motor is employed for an elevator car drive system, revolution speed of the electric motor has to be controlled according to a preset known schedule including acceleration stage and deceleration stage. In order to control the revolution speed of the electric motor, various control systems have been employed. The control system typically comprises an electric power converter and inverter for driving the electric motor at a controlled speed. The converter typically comprises a direct current (DC) rectifier for rectifying three-phase alternating current (AC) power and for supplying the rectified DC power to the inverter. The inverter comprises a plurality of pairs of series-connected switching elements to generate an adjustable frequency output. In many applications, frequency adjustment is effected through a control circuit which employs a pulse width modulated (PWM) control technologies for producing variable frequency gate output to periodically switch the motor at various speed. In the practical control, the electric motor is driven in motoring mode in the acceleration stage of the elevator car driving schedule for increasing the motor speed, and in braking mode in the deceleration stage of the elevator car driving schedule for decreasing the motor speed.

For adjusting the inverter output frequency and amplitude, various control technologies have been employed, such as proportional/integral (PI) control, vector control and so forth. In general, the motor speed control has been performed employing FEEDBACK or CLOSED LOOP control technologies for adjusting the motor revolution speed to a desired speed which is determined according to the preset motor drive schedule. For this, the actual revolution speed of the electric motor is monitored and compared with the desired speed to produce a speed error signal. Based on this speed error signal, PI control is performed for reducing the error to zero. For performing motor speed control employing the PI control technologies, a PI control circuit is provided. The PI control circuit has a transfer function Gc(S) which can be illustrated by the following equation:

$$Gc(S) = Kp + Ki/S$$

where Kp and Ki are control constants.

The PI control circuit receives the actual motor speed data Wc as FEEDBACK data and compares the same with the desired speed data Ws in order to derive a torque control signal Itc. The torque control signal Itc is applied to the electric motor for adjusting the revolution speed for decreasing the error between the actual motor speed Wc and the desired speed Ws toward zero (0).

In PI control technology, the response characteristics are determined by the control constants Kp and Ki. Generally, these control constants Kp and Ki are set in consideration of the inertia moment of the load on the electric motor. Conventionally, the control constants Kp and Ki are set as fixed values. In case of the elevator car speed control, the load of the electric motro varies significantly depending upon the passengers in the elevator car. Since variation magnitude of the load on the electric motor is substantial, a difficulty has been encountered in obtaining optimal response characteristics at any load condition.

In the alternative, vector control technologies have also been employed in the motor speed control. The basic idea of the vector control is to divide a primary current into an excitation current and a secondary current, in order to control each independently of each other. The flux of the excitation current and the vector of the secondary current are so established as to cross perpendicularly to each other. For improving response characteristics and precision in vector control, interference between the secondary flux component and secondary current component is avoided. The interference avoidance technology has been disclosed in Japanese Patent First (unexamined) Publication 59-165982, for example.

In such vector control, basic electric equation illustrating the induction motor by two axes d–q rotating at electric angular velocity $\omega$ is as follows:

$$\begin{bmatrix} V_1d \\ V_1q \\ 0 \\ 0 \end{bmatrix} = \begin{bmatrix} R_1 + L_1P & -\omega L_1 & MP & -\omega M \\ \omega L_1 & R_1 + L_1P & \omega M & MP \\ MP & -\omega_s M & R_2 + L_2P & -\omega_s L_2 \\ \omega_s M & MP & \omega_s L_2 & R_2 + L_2P \end{bmatrix} \begin{bmatrix} i_1d \\ i_1q \\ i_2d \\ i_2q \end{bmatrix} \quad (1)$$

On the other hand, the torque T can be illustrated by the following equation:

$$T = K \times (i_2d \times i_1q - i_2q \times i_1d) \quad (2)$$

where
$V_1d$, $V_1q$ are primary voltage of d axis and q axis;
$i_1d$, $l_1q$ are primary current of d axis and q axis;
$i_2d$, $l_2q$ are secondary current of d azis and q axis;
$R_1$, $R_2$ are primary and secondary resistances;
$L_1$, $L_2$ are primary and secondary inductances;

M is relative inductance of primary and secondary inductances;

P is d/dt $\omega_s$ is slip frequency; and

K is constant.

In the equation set forth above, the q axis is set as the axis of the secondary current and d axis is set as the axis of the flux. Mutual interference of the secondary flux and the secondary current is compensated in order to derive the primary voltages $V_1d$ and $V_1q$ based on the excitation current command $i_O{}^*$ and torque current command $i_T{}^*$. In the practical vector control, angular velocity $\omega_r$ of a rotor in the electric motor is monitored by means of a pick-up. The monitored angular velocity $\omega_r$ is compared with the speed command $\omega^*$ to derive the torque current command $i_T{}^*$. Based on this torque current command $i_T{}^*$, the excitation current command $i_O{}^*$, and secondary time constant $\tau_2$, slip frequency $\omega_s$ is derived by the following equation:

$$\omega_s = i_T{}^*/(\tau_2 \times i_O{}^*)$$

Then a power source angular frequency $\omega_0$ is derived by adding the slip frequency $\omega_s$ derived as above to the angular velocity $\omega_r$ of the rotor of the motor. Then, sin wave signal SIN $\omega_O$ and cos wave signal COS $\omega_O t$ respectively having power source frequency $\omega_O$ are produced. Utilizing the sin wave signal SIN $\omega Ot$ and the cos wave signal COS $\omega Ot$, the voltage signal $V_1d$ and $V_1q$ for the axes d-q is derived on the basis of the excitation current command $i_O{}^*$ and the torque current command $i_T{}^*$. These primary voltages $V_1d$ and $V_1q$ are ⅔ phase converted to generate three phase voltages $ea^*$, $eb^*$ and $ec^*$. PWM control for the inverter is thus performed by the three phase voltages $ea^*$, $eb^*$ and $ec^*$ and a triangular wave in a known manner.

Such vector control is generally successful to improve the response characteristics in satisfactory level. However, due to presence of core loss, which is included in the torque current vector, the primary current in the braking mode becomes excessively smaller than normal value in relation to the primary current in the motoring mode. This clearly affects precision in motor speed control.

SUMMARY OF THE INVENTION

Therefore, it is an object of the present invention to provide a control system for controlling revolution speed of an electric motor with improved response characteristics and/or precision.

In order to accomplish the aforementioned and other objects, the present invention takes one approach to establish dummy load models having characteristics equivalent to an electric motor to be controlled. One of the dummy load models is established for feedback controlling the electric motor on the basis of the speed of the dummy model. The dummy model is divided into first and second models. The first model is designed to have equivalent characteristics to output a first motor speed representative data. The current to supply to the first model is so adjusted as to reduce a difference between the motor speed representative data and a desired motor speed data to zero. A frequency signal is added to the current applied to the first model and supplied to the electric motor to drive the latter. The second model receives the frequency signal to output a frequency signal dependent second motor speed representative value. Sum of the first and second motor speed representative value is compared with a measured motor speed indicative value to derive a speed difference compensation value based on the error therebetween. Based on the speed difference between the sum value and the measured motor speed and the frequency signal, inertia condition on the motor is assumed for controlling transfer characteristics so that the inertia condition in the first model becomes coincident with that of the motor.

According to one aspect of the invention, a motor speed control system comprises:

first means for generating a basic torque current for driving an electric motor at a revolution speed corresponding the magnitude of the torque current;

second means for producing a motor speed indicative signal representative of a revolution speed of the electric motor;

third means for generating a known frequency of a frequency signal which is to be added to the basic torque current for driviing the electric motor with a modified torque current;

fourth means, provided equivalent characteristics to that of the electric motor and connected to the first means for receiving the torque current, for generating a first reference speed indicative signal representative of a revolution speed of the electric motor corresponding to the input torque current;

fifth means, provided equivalent characteristics to that of the electric motor and connected to the third means for receiving the frequency signal, for generating a second reference speed indicative signal representative of a revolution speed of the electric motor corresponding to the input frequency signal;

sixth means, receiving the first reference signal, for deriving a difference between the first reference signal value and a desired motor speed representative value for controlling the first means for reducing the difference between the first reference signal value and the desired motor speed representative value to zero;

seventh means receiving the motor speed indicative signal, the first reference speed indicative signal and the second reference speed indicative signal, for deriving a difference between teh motor speed indicative signal value and a sum value of the first and second reference speed indicative signal values to produce a speed error signal;

eighth means, responsive to the speed error signal, for deriving a compensation signal based on the speed error signal value for modifying the torque current for compensating the speed error between the motor speed indicative signal value and the sum value; and ninth means, receiving the speed error signal and the frequency signal, for deriving an inertia representative data representative of an assumed inertia moment on the electric motor, and correcting a transfer characteristics of at least one of circuit components in such a manner that the inertia dependent factor in the fourth means becomes coincidence with that of the electric motor.

In the preferred embodiment, the ninth means further modifies transfer characteristics of at least one of circuit component for maintaining transfer function of overall motor speed controlling loop constant. Alternatively, the third means may be so designed as to produce the frequency signal which has signal value variation characteristics to have an average value zero, or in the alternative to have an integrated value which becomes zero.

Further preferably, the fourth and fifth means have first and second transfer elements which are variable of transfer characteristics, the first and second transfer elements of fourth and fifth means being adjusted so that the transfer characteristics reduce the speed error signal value to zero on the basis of the inertia representative data of the ninth means. The sixth means includes a third transfer element which is variable of transfer characteristics depending on the inertia representative data, the transfer characteristics of the transfer element being adjusted so as to maintain transfer function of overall speed control loop constant.

In the alternative, the motor speed control system may further comprises a transfer element variable of transfer characteristics depending upon the inertia representative data for adjusting the modified torque current to be supplied to the electric motor so as to compensate difference of inertia factors in the electric motor and the fourth means.

According to another aspect of the invention, a motor speed control system comprises:

first means for generating a torque current for driving an electric motor at a revolution speed corresponding the magnitude of the torque current;

second means for producing a motor speed indicative signal representative of a revolution speed of the electric motor;

third means, provided equivalent characteristics to that of the electric motor and connected to the first means for receiving the torque current, for generating a first reference speed indicative signal representative of a revolution speed of the electric motor corresponding to the input torque current;

fourth means, receiving the first reference signal, for deriving a difference between the first reference signal value and a desired motor speed representative value for controlling the first means for reducing the difference between the first reference signal value and the desired motor speed representative value to zero; and fifth means interposed between the first means and one of the electric motor and the third means, for limiting the torque current to be supplied at least one of the electric motor and the third means within a predetermined range.

The fifth means may comprise a first limiter interposed between the first means and the third means for limiting torque current to be supplied to the third means within a first given range and a second limiter interposed between the first means and the electric motor for limiting torque current to be supplied to the electric motor within a second given range. The second limiter may be provided between the first limiter and the electric motor.

The motor speed control system according to another aspect of the invention set forth above, may further comprise:

a sixth means receiving the motor speed indicative signal and the first reference speed indicative signal for deriving a difference between the motor speed indicative signal value and a the first reference speed indicative signal value to produce a speed error signal; and seventh means, responsive to the speed error signal, for deriving a compensation signal based on the speed error signal value for modifying the torque current for compensating the speed error between the motor speed indicative signal value and the sum value. Furthermore, the motor speed control system may further comprise:

eighth means for generating a known frequency of a frequency signal which is to be added to the basic torque current for driving the electric motor with a modified torque current;

ninth means, provided equivalent characteristics to that of the electric motor and connected to the eighth means for receiving the frequency signal, for generating a second reference speed indicative signal representative of a revolution speed of the electric motor corresponding to the input frequency signal;

the sixth means receiving the motor speed indicative signal, the first reference speed indicative signal and the second reference speed indicative signal, for deriving a difference between the motor speed indicative signal value and a sum value of the first and second reference speed indicative signal values to produce a speed error signal;

tenth means, receiving the speed error signal and the frequency signal, for deriving an inertia representative data representative of an assumed inertia moment on the electric motor, and correcting a transfer characteristics of at least one of circuit components in such a manner that the inertia dependent factor in the fourth means becomes coincidence with that of the electric motor.

According to a further aspect of the invention, a motor speed control system for an induction motor, comprises:

the induction motor;

a motor driving circuit for applying power to drive the motor, a sensor means associated with the indication motor, for monitoring a revolution speed thereof and producing a motor speed indicative signal; and a vector controlling means for controlling a flux-axis primary current $I1_q$, a torque-axis primary current $I1_d$ and slip frequency $\omega s$ to establish the following condition:

$$I1_q = I_o \text{ (constant)};$$

$$I1_d = -(I_T + I_o'); \text{ and}$$

$$\omega s = \{(R_2 + Srm)\}/L_2 \times I_T/I_o - Srm/M \times \{(I_T + I_o') - /I_o\}$$

where
$I_o$ is a set excitation current value;
$I_T$ is a set torque current value;
$I_o'$ is a core loss current value;
$R_2$ is a secondary resistance;
S is a slip;
rm is a core loss resistance;
$L_2$ is a secondary inductance; and
M is a relative inductance Preferably, the vector controlling means corrects the set torque current value $I_T$ based on a torque command T to establish the following equation:

$$i_T = (-B + \sqrt{B^2) + 4 \times T/Kr \times A}\ )/2A$$

where
$A = (rmM^2/\omega L_2) \times (1/M - 1/L_2)$,
$B = (1 + rm^2/\omega^2 M^2) \times (M^2/L_2) \times I_o$ According to a still further aspect of the invention, a motor speed control system for an induction motor, comprises:

the induction motor;

a motor driving circuit for applying power to drive the motor, a sensor means associated with the indication motor, for monitoring a revolution speed thereof and producing a motor speed indicative signal; and a vector controlling means for controlling a flux-axis primary current $I1_q$, a torque-axis primary current $I1_d$ and slip frequency $\omega s$ to establish the following condition:

$$I1_d = -\{(Rm^2+\omega^2ML_2)/(Rm^2+\omega^2M^2)\} \times I_T^* - \{\omega MRm/(Rm^2+\omega^2M^2)\} \times I_o^*$$

$$I1_q = \{\omega^2M^2/(Rm^2+\omega^2M^2)\} \times I_o^* + \{(Rm\omega(M-L_2)/(Rm^2+\omega^2M^2)\} \times I_T^*$$

$$\omega s = R_2/M \times I_T^2/I_o^2$$

where
$I_T^*$ is torque current command;
$I_o^*$ is excitation current command;
M is a relative inductance;
$L_2$ is a secondary inductance;
$R_2$ is a secondary resistance; and
$\omega$ is a power source angular frequency.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 3 is a partial and explanatorily established block diagram showing circuit components for motor speed control in the first embodiment of the motor speed control system of FIG. 1;

FIG. 4 is a partial and explanatorily established block diagram showing circuit components for adjusting the electric motor speed following to variation of speed of dummy load models;

DESCRIPTION OF THE PREFERRED EMBODIMENT

Figure 1:
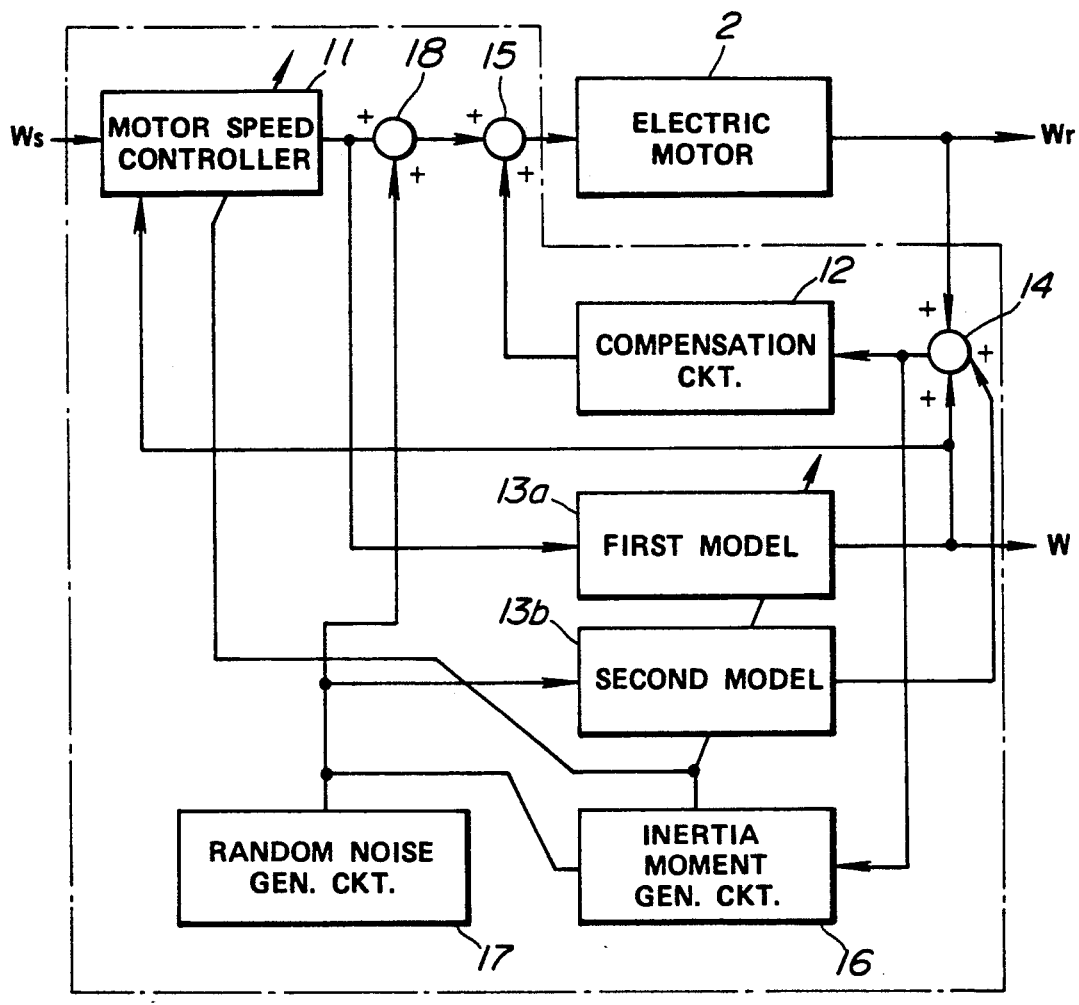
FIG. 1 is a conceptually illustrated block diagram of the first embodiment of a motor speed control system, according to the invention.

Referring now to the drawings, particularly to FIG. 1, the first embodiment of a motor speed control system, according to the present invention, generally comprises a control circuit 1 and an electric motor 2 to which a load is applied. The control circuit 1 has a motor speed controller 11, to which a desired motor speed data Ws is input. The motor speed controller 11 is connected to the electric motor 2 via adders 18 and 15 which will be discussed later. The motor speed controller 11 outputs a torque current It to the electric motor 2. The motor speed controller 11 is also connected to a first dummy load model 13a having characteristics equivalent to the electric motor 2. The first dummy load model 13a is arranged in parallel to the electric motor 2 and receives the torque current It. Based on the torque current It, the first dummy load model 13a produces a first dummy speed representative data W indicative of a speed of the first dummy load model derived at equivalent condition to that of the electric motor. The first dummy load model 13a feeds the derived first dummy speed representative data W to the motor speed controller 11 as a feedback data.

The motor speed controller 11 compares the first dummy speed representative data W with the desired motor speed data Ws to obtain the difference therebetween. The motor speed controller 11 derives the magnitude of torque current It on the basis of the difference for reducing the difference to zero. Therefore, the first dummy load model 13a and the motor speed controller 11 forms a CLOSED LOOP for feedback controlling the motor speed.

The shown embodiment of the motor speed control system also has a second dummy load model 13b which has equivalent characteristics to the electric motor 2 to be controlled. The second dummy load model 13b is connected to a random noise generator circuit 17 generating a random noise current, to receive the random noise current from the latter. The second dummy load model 13b generates an output variable depending upon the random noise current input from the random noise generator circuit 17. The output of the second dummy load model 13b will be hereafter referred to as "inertia indicative data" is fed to a subtractor 14 to which the first dummy speed representative data W and a motor speed indicative data Wr as a data representative of the actual revolution speed of the electric motor 2. The subtractor 14 subtracts the actual motor speed data Wr from the sum value of the first dummy speed representative data W and the inertia indicative data to produce a speed difference indicative data. This speed difference indicative data e is fed to a compensation circuit 12 which has transfer function consisted of a proportional element and an integral element to produce a speed difference dependent compensation signal. This compensation signal is fed to the adder 15 to be added to the motor control signal so that the motor speed can be adjusted to reduce the error to be derived in the subtractor to be zero.

The random noise current of the random noise generator circuit 17 is fed to the adder 18 and to an assumed inertia moment generator circuit 16. The assumed inertia moment generator circuit 16 further receives the speed difference indicative data from the subtractor and derives an assumed inertia moment on the electric motor 2 on the basis of the random noise current from the random noise generator circuit 17 and the difference indicative data.

Detailed construction of the circuit components of the aforementioned first embodiment of the motor speed control system will be discussed herebelow with reference to FIG. 2. The motor speed controller 11 comprises tranfer elements 111 and 112 and a subtractor element 113. The subtractor element 113 receives the desired motor speed data Ws and the first dummy speed representative data W. The subtractor 113 outputs a speed error data $\Delta W$ ($=Ws-W$) indicative of the speed error of the actual motor speed versus the desired motor speed.

As long as the characteristics of the electric motor 2 precisely coincides with the first dummy load model 13a, the first dummy speed representative data W precisely represents the motor speed of the electric motor 2. Therefore, adjusting the characteristics of the first dummy load model 13a to match that of the electric motor 2, precise feedback control of the motor speed to the desired motor speed Ws can be established.

The transfer element 111 is provided transfer characteristics defined by ($Kp' + Ki'/S$), where $Kp'$ and $Ki'$ are given constant values and S is an operator. Therefore, the transfer element 111 amplifies the speed error data $\Delta W$ with the transfer characteristics ($Kp'+Ki'/S$) and feeds to an adder element 114. On the other hand, the transfer element 112 has a transfer characteristics $Kg'S$ where $Kg'$ is predetermined value. The transfer characteristics $Kg'S$ is variable depending upon the output of the inertia moment generator circuit 16. The transfer element 112 is interposed between the first dummy load model 13a and the adder element 114 to amplify the first dummy speed representative data W with the given characteristics $Kg'S$ to input to the adder element 114. The adder element 114 adds the input from the transfer elements 111 and 112 to derive the torque current It to feed the electric motor 2 via the adders 18 and 15. To the adder 18, the random noise of the random noise generator circuit 17 is input. On the other hand, to the adder 15, the compensation signal of the compensation circuit 12 is input. Therefore, the input to the electric motor 2 has a value corresponding to a sum value of the torque current It, the random noise of the random noise generator circuit 17 and the compensation signal of the compensation circuit 12.

The electric motor 2 has transfer elements 201 and 202 and an adder 203 interposed between the transfer elements 201 and 202. The transfer element 201 is provided a transfer characteristics Km. On the other hand, the transfer element 307 is provided a transfer characteristics $1/JrS$. The transfer element 201 amplifies the torque current It with the given transfer characteristics Km. The output of the transfer element 201 is input to the adder 203. On the other hand, the adder 203 is also connected to a load to receive therefrom a torque load indicative data $T_L$. The adder 203 thus produce an output as a sum of the output of the transfer element 201 and the torque load indicative data $T_L$. The transfer element 202 receives and amplifies the adder output with the given transfer characteristics $1/JrS$ to output the motor speed indicative data Wr.

The torque current It is also fed to the first dummy load model 13a as set forth. The first dummy load model 13a has transfer elements 131 and 132 respectively corresponding to the transfer elements 201 and 202 of the electric motor 2. Namely, the transfer elements 131 is provided a transfer characteristics Km. On the other hand, the transfer element 132 is provided a transfer characteristics $1/JS$ which is variable depending upon the output of the inertia moment generator circuit 16. With the transfer elements 131 and 132, the torque current It are amplified so as to be output as the first dummy speed representative data W.

Likewise, the second dummy load model 13b also has transfer elements 133 and 134 having corresponding transfer characteristics to that of the transfer elements 131 and 132 of the first dummy load model 13a and, in turn, to the electric motor 2. The transfer element 133 is connected to the random noise generator circuit 17 which is designed to produce a random noise set to have average value zero (0). The transfer elements 133 and 134 of the second dummy load model 13b amplifies the random noise with the given transfer characteristics Km and $1/JS$ to output the inertia indicative data to the subtractor 14.

The subtractor 14 subtracts the motor speed indicative data Wr from the sum value of the first dummy speed representative data W and the inertia indicative data to derive the speed difference indicative data e. The speed difference indicative data e is fed to the compensation circuit 12 which has a transfer element 121 provided transfer characteristics ($Kr+Ks/S$), where Kr and Ks are constants. The transfer element 121 amplifies the speed difference indicative data e with the set transfer characteristics ($Kr+Ks/S$) to output the compensation signal Ix.

The random noise generated by the random noise generator circuit 17 is also fed to the inertia moment generator circuit 16. The inertia moment generator circuit 16 has a lag element 161 connected to the random noise generator circuit 17 and feeds the random noise current In input from the latter with a predetermined lag time. The inertia moment generator circuit 16 also includes a transfer element 162 and a multiplier element 163. The transfer element 162 is provided a transfer characteristics of $Ka\tau/(S+\tau)$ where Ka is predetermined constant, $\tau$ is time constant. On the other hand, multiplier element 163 receives the random noise current In delayed by the lag element 161 and the speed difference indicative data e. The multiplier element 163 derives a product of the random noise current In and the speed difference indicative data e. The produce ($e \times In$) is fed to the transfer element 162 which serves as primary delay element. The transfer element 162 derives an average value of the produces received from the multiplier element 163 to output the assumed inertia moment representative data y. The inertia moment representative data y is fed to the transfer element 112 to adjust the Kq' value of the transfer characteristics thereof. Similarly, the inertia moment representative data y is fed to the transfer elements 132 and 134 to adjust the J value of the transfer characteristics thereof. Therefore, the transfer characteristics Kq'S and 1/JS of the transfer elements 112, 132 and 134 are adjusted depending upon the assumed inertia moment which corresponds to the actual inertial applied to the electric motor 2.

Here, the circuit components relevant for controlling the speed of the first dummy load model 13a is illustrated in FIG. 3. The process of speed control in the first dummy load model 13a will be discussed with reference to FIG. 3. The manner of speed control of the first dummy load model can be illustrated by:

$$W(S) = \{(Kp \times S + Ki) \times Ws\} / \{(Kq + J) \times S^2 + Kp \times S + Ki\} \quad (1)$$

where
$Kp = Km \times Kp'$,
$Ki = Ki' \times Km$
$Kq = Km \times Kq'$

In the above equation (1), when the inertia moment Jr of the motor 2 varies to cause the necessity of varying the inertia moment representative value J of the first dummy load model 13a, the transfer function of the feedback loop can be maintained constant by adjusting the Kq' of the transfer element 112. Therefore, by adjusting the Kq' value of the transfer element 112, the transfer function of the transfer element 132 can be maintained unchanged.

On the other hand, circuit components relevant for assuming the inertia moment Jr of the electric motor 2 are illustrated in FIG. 4. The manner of deriving the assumed motor inertia moment Jr will be discussed herebelow with reference to FIG. 4. As will be seen from FIG. 4, the output of the subtractor 14 as the speed difference representative data e is derived by subtracting the motor speed indicative data Wr from the sum of the outputs of the first and second dummy load models 13a and 13b. The speed difference representative data e can be illustrated by:

$$e(S) = S/(S^2 + KmKr/J \times S + KmKs/J) \times \{Km/J - Km/Jr) \times (It + In) - TL/Jr\} \quad (2)$$

Figure 2:
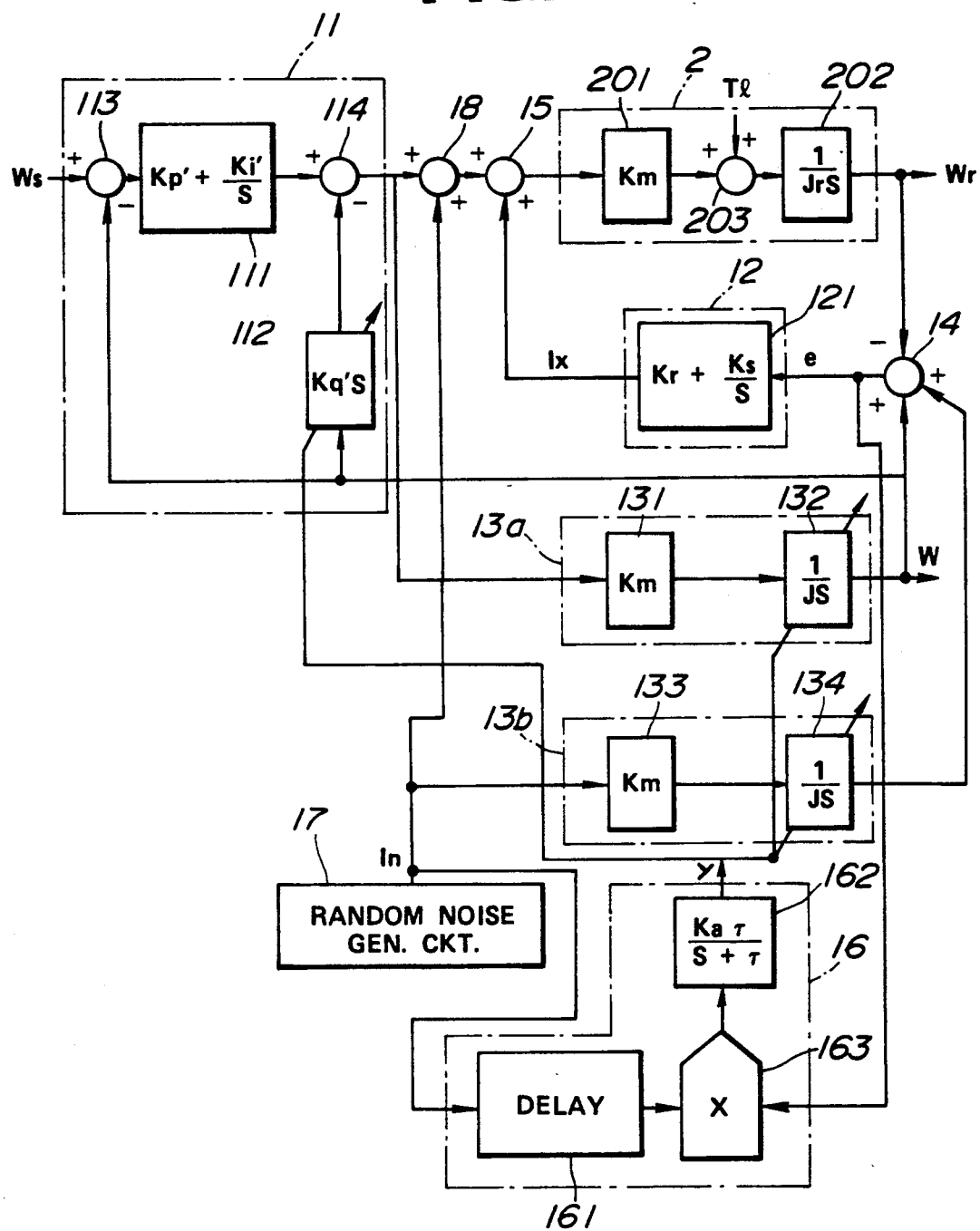
FIG. 2 is a block diagram of the first embodiment of the motor speed control system of FIG. 1.

The multiplier element 163 receives the speed difference indicative data e from the subtractor 14 and the random noise current In from the random noise generator 17 as seen from FIG. 2. The output of the multiplier element 163, which presents the product of the speed difference indicative data e and the random noise current In, is integrated in the transfer element 162 to derive the inertia moment representative data y. Here, since the random noise current In is formulated to have the average value zero, the component associated with the random noise current In in the foregoing equation (2) becomes zero as integrated in the transfer element. The torque load $T_L$ and the torque current It can be regarded as known value in derivation of the inertia moment representative data y. Therefore, the foregoing equation (2) can be regarded as an equation having a variable which varies depending upon a difference of the inertia moments Jr and J in the electric motor 2 and the first dummy load model. Therefore, by adjusting the inertia J of the first dummy load model 13a according to the following equation:

$$J_n = J_{n-1} \times (1 + y) \quad (3)$$

where $J_n$ is instantaneous inertia representative value of the first dummy load model 13a, and $J_{n-1}$ is an inertia representative value of the first dummy load model 13a in an immediately preceding calculation cycle, the speed difference indicative data e can be adjusted to zero.

In the alternative, the inertia moment representative data y can be described by $$y = L^{-1}\{Y\}$$

where L is Laplace transformation cofficient and $L^{-1}$ is Laplace reverse transformation coefficient, and $$Y = \{Ka\tau/(S+\tau)\} \times L\{In \times e\} \quad (4)$$

In order to maintain the transfer function of the CLOSED LOOP of motor speed control system despite variation of the inertia moment J in the first dummy load model 13a, it becomes necessary to adjust the constant Kq' in the transfer element 112 in the motor speed controller 11. Adjustment of the constant Kq' is performed by the following equation:

$$Kq'_n = Kq'_{n-1} - J_{n-1} \times y \quad (5)$$

where $Kq'_n$ is a constant in the current calculation cycle, and $Kq'_{n-1}$ is a constant in the immediately preceding calculation cycle.

Figure 5:
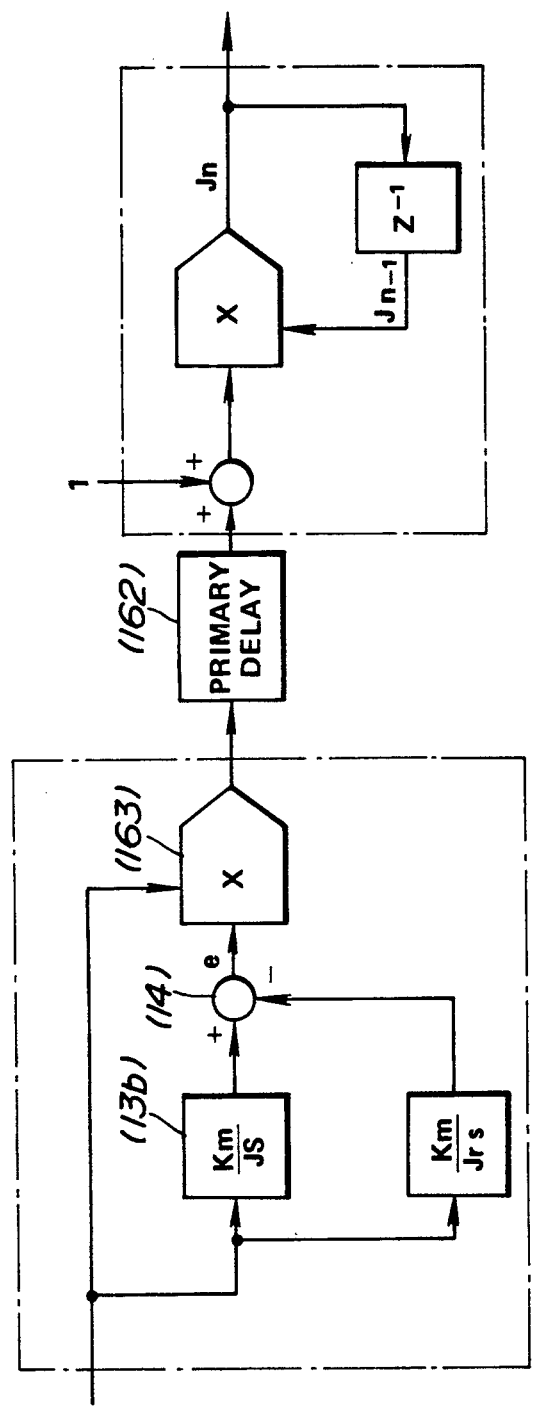
FIG. 5 is a logical illustration of the first embodiment of the motor speed control system of FIG. 1.

FIG. 5 explanatorily illustrates circuit components associated for adjusting the Kq' constant. As will be appreciated, in FIG. 5, the circuit component which is associated for torque current dependent values are neglected for simplification of the disclosure.

As will be seen from FIG. 5, the second dummy load model 13b as labeled (Km/JS), the electric motor 2 as illustrated in a form avoiding the torque load factor $T_L$ and as labeled (Km/JrS), the subtractor 14 and the multiplier element 163 in the inertia moment generator circuit 16 form a noise multiplier stage. The transfer element 162 of the inertia moment generator circuit 16, serves as the primary delay factor as set forth above.

In FIG. 5, the J value derivation stage is illustrated as pure functional block for implementing the arithmetic operation, according to the foregoing equation (3). As will be appreciated, in a multiplier stage (labeled by "X"), the arithmetic operation according to the equation (3) is performed. The resultant value is output as the inertia representing parameter J of the first and second dummy load models 13a and 13b. The output of the multiplier stage (X) is fed back via a delay (labeled as "$Z^{-1}$") to the multiplier stage as $J_{n-1}$ data.

As will be appreciated herefrom, the shown embodiment of the motor speed control system can provide improved and satisfactorily high response characteristics to variation of the inertia moment in the electric motor with simplified circuit construction and with simplified arithmetic operation process in derivation of the inertia moment of the dummy model.

Figure 6:
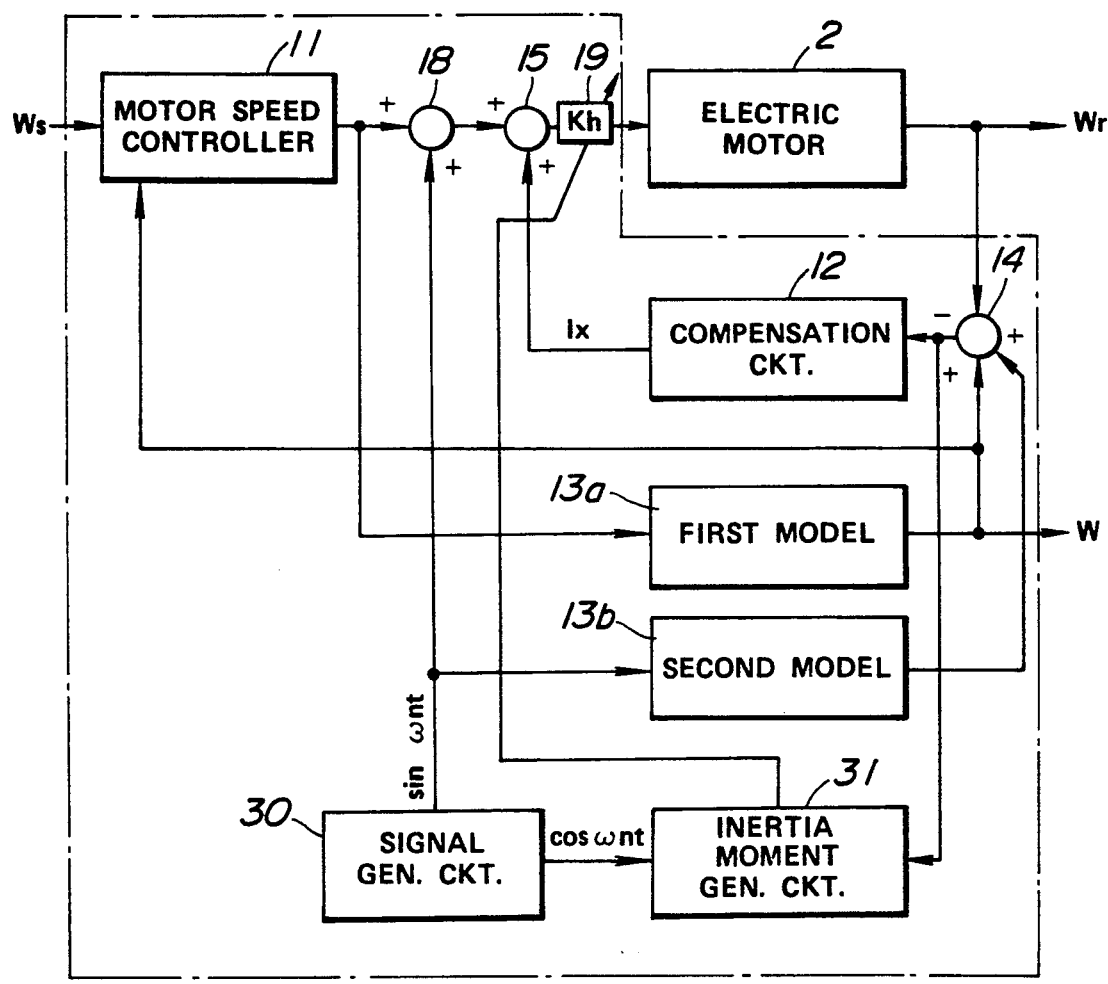
FIG. 6 is a conceptually illustrated block diagram of the second embodiment of a motor speed control system, according to the invention.

FIG. 6 shows the second embodiment of the motor speed control system, according to the invention. Since the shown second embodiment replaces the random noise current generator circuit 17 in the foregoing first embodiment of the motor speed control system set forth above with a signal generator circuit 30. The common circuit components betweeen the first and second embodiments will be represented by the same reference numerals for avoiding redundant disclosure.

The signal generator circuit 30 is designed to generate a sin wave signal $\sin_{\omega nt}$ and a cos wave signal $\cos_{\omega nt}$. The sin wave signal $\sin_{107\ nt}$ is fed to the adder 18 and to the second dummy load model 13b. In the alternative, the cos wave signal $\cos_{\omega nt}$ is fed to an inertia moment generator circuit 31. The second embodiment of the motor speed control system has a torque coefficient adjusting circuit 19. The torque coefficient adjusting circuit 19 is interposed between the adder 15 and the electric motor 2. The torque coefficient adjusting circuit 19 is also associated the inertia moment generator circuit 31 for varying the torque coefficient based on the input from the inertia moment generator circuit 31.

The inertia moment generator circuit 31 receives the speed difference indicative data e from the subtractor 14 and the cos wave signal $\cos_{\omega nt}$ from the signal generator circuit 30 to derive an inertia moment indicative data y'. By the inertia moment indicative data y', the coefficient in the torque coefficient adjusting circuit 19 is adjusted so that inertia moments in the electric motor 2 and the second dummy load model 13b coincide to each other.

Figure 7:
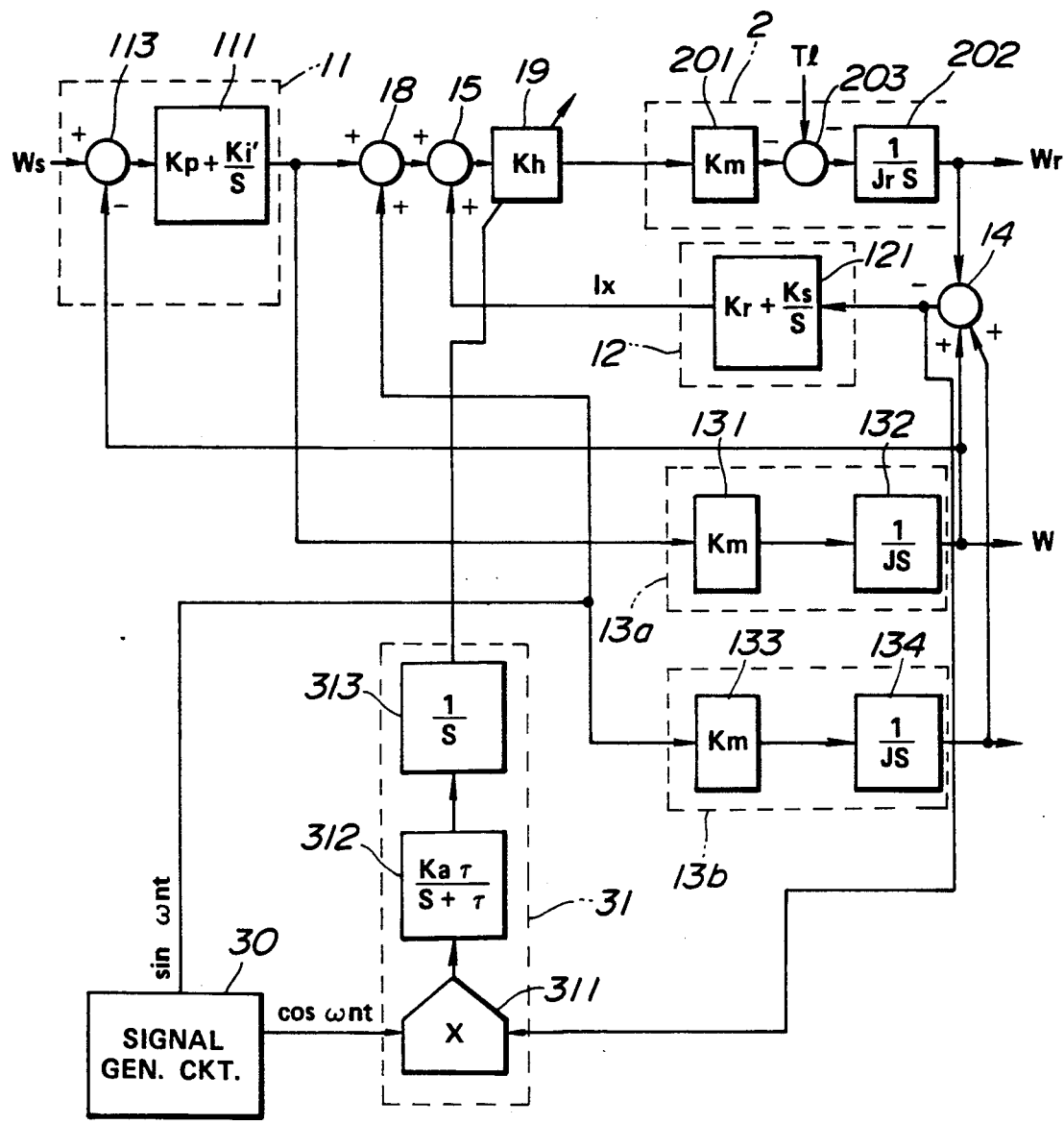
FIG. 7 is a block diagram of the second embodiment of the motor speed control system of FIG. 6.

FIG. 7 shows detailed construction of the second embodiment of the motor speed control system according to the invention. In this embodiment, the inertia moment generator circuit 31 comprises a multiplier element 311, a primary delay element 312 which is labeled as "$Ka\tau/(S+\tau)$" and designed to integrate the input from the multiplier element for deriving an average value, and a transfer element 313 as labeled "1/S".

In FIG. 7, the circuit constructions of the motor speed controller 11, the electric motor 2, the compensation circuit 12, and the first and second dummy load models 13a and 13b are substantially the same as that in the former embodiment. Therefore, such common elements will be represented by the same reference numerals and redundant detailed discussion avoided.

Figure 8:
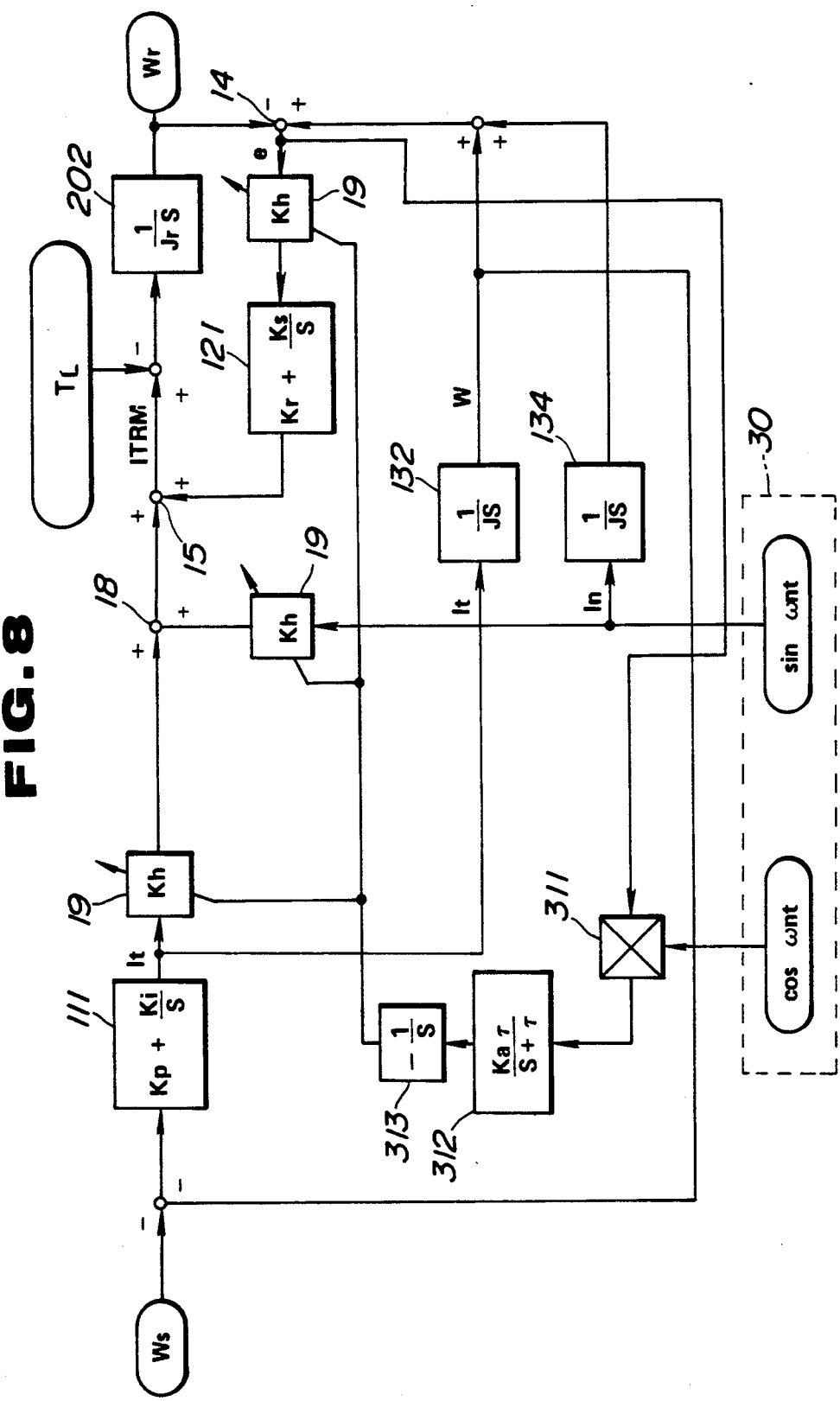
FIG. 8 is a block diagram equivalent to that illustrated in FIG. 7 but showing algorithm of motor speed control implemented by the second embodiment of the motor speed control system of FIG. 7.

The operation of the motor speed control system of FIG. 7 will be discussed herebelow. In the following discussion, reference is made to FIG. 8 which shows the same circuit components to that of FIG. 7 but shown in a manner convenient for disclosing the algorithm of intertia variation compensating operation to be performed by the shown system.

When the inertia moment 1/JrS of the electric motor 2 varies, an error e of the speeds between the motor speed and the speeds of first and second dummy load models 13a and 13b which have the inertia moment 1/JS. As set forth above, the error is represented by the speed difference indicative data e as the output of the subtractor 14

The speed difference indicative data e can be illustrated by:

$$e = W + W_{DD} - Wr \quad (6)$$

where $W_{DD}$ is the output value of the second dummy load model 13b, $$W = It \times (1/JS) \quad (7)$$

$$W_{DD} = \sin \omega_n t \times 1/JS \quad (8)$$

$$Wr = \{It + \sin \omega_n t + e(Kr + Ks)\} \times (Kh/Jrs) \quad (9)$$

From the foregoing equations (7) to (9), the equation (6) can be modified as:

$$\begin{aligned}
e &= (IT = \sin\omega_n t) + (1/JS) - \\
&\quad \{It + \sin_{\omega nt} + e(Kr + Ks)\} \times (Kh/Jrs) \\
&= 1/\{1 + 1/JrS \times (Kr + Ks/S)\} \times \\
&\quad (It + \sin\omega_n t) \times \{(1/Js) - (Kh/Jrs)\} \\
&= \{S/(S^2 + (KhKr/Jr) \times S + (KhKs/Jr)\} \times \\
&\quad (It + \sin\omega_n t) \times \{(1/J) - (Kh/Jr)\}
\end{aligned} \quad (10)$$

By Fourier transformation, the equation can be transformed into:

$$\begin{aligned}
F(e) &= j\omega/\{((KhKs/Jr) - \omega^2) + j\omega \times \\
&\quad (KhKr/Jr)\} \times (F(It) + F(\sin\omega_n t) \times (1/J - Kh/Jr) \\
&= j\omega\{((KhKs/Jr) - \omega^2) - j\omega \times (KhKr/Jr)\} + \\
&\quad \{((KhKs/Jr) - \omega^2)^2 + (\omega KhKr/Jr)^2\} \times \\
&\quad (F(It) + F(\sin\omega_n t)) \times \{(1/J) - (Kh/Jr)\} \\
&= \omega^2 + (KhKr/Jr) + \{((KhKs/Jr) - \omega^2)^2 + \\
&\quad (\omega KhKr/Jr)^2\} + j\omega\{(KhKs/Jr - \omega^2) + \\
&\quad \{(KhKs/Jr - \omega^2)^2 + (\omega KhKr/Jr)^2\} \times (F\ It) + \\
&\quad F(\sin\omega_n t)) \times \{(1/J) - (Kh/Jr)\}
\end{aligned} \quad (11)$$

where $\omega$ is angular frequency.

Here, assuming the angular frequency $\omega$ is $\omega n$, the equation (11) can be modified as:

$$\begin{aligned}
e &= \omega n^2 \times (KhKr/Jr) + \\
&\quad \{((KhKs/Jr) - \omega n^2)^2 + (\omega n KhKr/Jr)^2\} + \\
&\quad j\omega n\{(KhKs/Jr) - \omega n^2)\} + \{(KhKs/Jr) - \omega n^2\}^2 + \\
&\quad (\omega n KhKr/Jr)^2\} \times (It + \sin\omega_n t) \times \{(1/J) - (Kh/Jr)\}
\end{aligned} \quad (12)$$

Here, since the segments associated with It value becomes zero when multiplied by the cos wave signal cos $\omega_n t$ and the produce is integrated, this segment will be ignored in the following discussion. The segments in the foregoing equation (12) are take as follows:

$$\omega n \times (KhKr/Jr) \approx \{(KhKs/Jr) - \omega n^2\}^2 + (\omega n KhKr/Jr)^2 = A$$

$$j\omega n\{(KhKs/Jr) - \omega n^2\} \approx \{(KhKs/Jr) - \omega n^2\}^2 + (\omega n KhKr/Jr)^2 = B$$

By this, the foregoing equation (12) can be modified as:

$$e = (A + jB) \times \{(1/J) - (Kh/Jr)\} \times \sin \omega_n t \quad (13)$$

This can be further modified as:

$$e(t) = (A \sin \omega_n t + B \cos \omega_n t) \times \{(1/J) - (Kh/Jr)\} \quad (14)$$

In the practice, inertia moment difference dependent control is performed so as to make the speed difference indicative data e and the cos wave signal cos $\omega_n t$ does not corelate. For this, a product of the e value and cos $\omega_n t$ is obtained. An average value of the products is obtained by integrating. The integrated value C is illustrated by $$C = 1/T \times \int_{-T/2}^{T/2} e(t) \times \cos\omega_n t \times dt \quad (15)$$

where T is a period of sin and cos waves $$= 1/T \times \int_{-T/2}^{T/2} (A\sin\omega_n t \times \cos\omega_n t + B\cos\omega_n t) \times$$

-continued $$\{(1/J) - (Kh/Jr)\} \times \cos\omega_n t \times dt$$

$$= 1/T \times \{(1/J) - (Kh/Jr)\} \int_{-T/2}^{T/2} (A\sin\omega_n t \times \cos\omega_n t + B\cos^2\omega_n t) dt$$

$$= 1/T \times \{(1/J) - (Kh/Jr)\} \int_{-T/2}^{T/2} \{A \times \sin2\omega_n t/2 + B \times (\cos2\omega_n t - 1/2)\} dt$$

$$= 1/T \times \{(1/J) - (Kh/Jr)\} \times A \int_{-T/2}^{T/2} (\sin2\omega_n t/2) dt + B \int_{-T/2}^{T/2} (\cos2\omega_n t - 1) dt - B \int_{-T/2}^{T/2} (1/2) dt$$

$$= -B/2 \times \{(1/J) - (Kh/Jr)\} \quad (16)$$

The equation (16) can be converted into:

$$C = -(1/2) \times \{(1/J) - (Kh/jr)\} \times \{\omega n(Kh \times Ks/Jr) - \omega n^2\}/\{(KhKS/Jr) \times \omega n^2\}^2 + (\omega n \times Kh \times Kr/Jr)^2 \quad (17)$$

So as to avoid corelation between the speed difference indicative data e and the cos wave signal cos $\omega_n t$, the integrated value has to be zero (0). For this, the following condition must be established:

$$(1/J) - (Kh/Jr) = 0 \quad (18)$$

$$(KhKs/Jr) - \omega n^2 = 0 \quad (19)$$

From the equations (18) and (19), the following equations can be established:

$$Kh = Jr/J \quad (20)$$

$$Kh = (Jr/Ks) \times \omega n^2 \quad (21)$$

When adjustment adjusting circuit is performed utilizing a tiny signal having a frequency of 20 Hz, under the condition in which $\omega n = 40\pi$ (rad/sec), $Ks = 0.01045$, $Jr = 0.001741$, the torque coefficient Kh becomes 20.94 which exceeds a limit. This can be compensated by the equation (20).

As will be appreciated, similarly to the foregoing first embodiment, the shown embodiment of the motor speed control system can exhibit satisfactorily high response characteristics.

Figure 9:
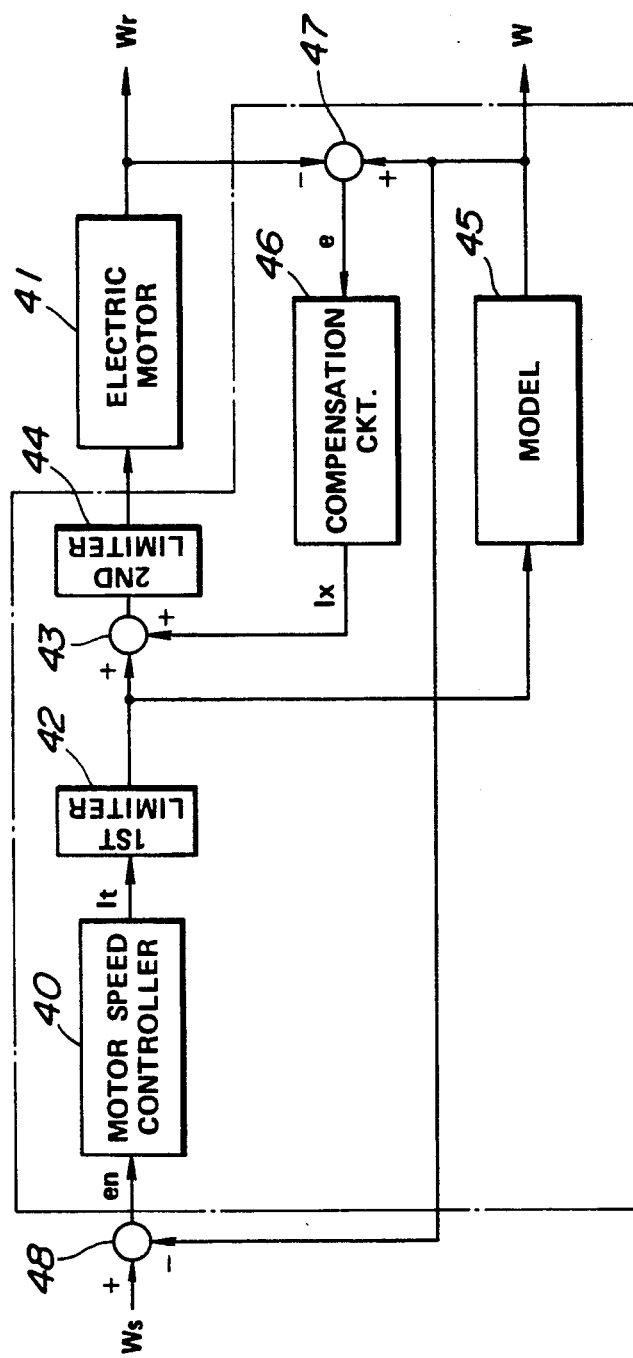
FIG. 9 is a schematic and conceptually illustrated block diagram of the third embodiment of a motor speed control system according to the present invention.

FIG. 9 shows the third embodiment of a motor speed control system, according to the present invention. Though the following discussion will be given in relation to the schematically illustrated block diagram of the third embodiment of the invention, in which only essential circuit components are shown, the shown embodiment may be applicable for the first and second embodiments of the motor speed control systems set forth above.

As seen from FIG. 9, the shown embodiment of the motor speed control system, according to the invention, comprises a motor speed controller 40 which is connected to an electric motor 41 via a first limiter 42, an adder 43 and a second limiter 44. Also, the motor speed controller 40 is connected to a dummy load model 45 via the first limiter 42. The dummy load model 45 has an equivalent circuit construction and transfer characteristics to that of the electric motor 41. As will be appreciated that the dummy load model 45 may correspond to the first dummy load models in the foregoing first and second embodiments of the motor speed control systems.

The shown embodiment of the motor speed control system further comprises a compensation circuit 46 connected to a subtractor 47 which calculates an error between a motor speed Wr output from the electric motor 41 and a dummy speed W of the dummy load model 45 to produce a speed difference indicative data e. The compensation circuit 47 is provided transfer characteristics of Kr+Ks/S to derive a compensation signal Ix on the basis of the speed difference indicative data e. The compensation signal is fed to the adder 43 to be added with the torque current It input from the first limiter 42.

The motor speed controller 40 is connected to a subtractor 48 which receives a desired motor speed data Ws and the dummy speed data W from the dummy load model 45 to derive an error therebetween. The speed error indicative data en derived by the subtractor 48 is fed to the motor speed controller 40. The motor speed controller 40 derives the torque current It on the basis of the speed error data en. The first limiter 42 receives the torque current It output from the motor speed controller 40 and prevents the current to be applied to the dummy load model 45 from becoming excessive.

The torque current It derived by the motor speed controller 40 can be illustrated by the following equation:

$$It(n) = KEN(n) + EX(n)$$

where
KEN(n) = Kp × en(n)
EX(n) = Ex(n−1) + (Ts/2) × KI {en(n−1) + En(n)}
Ts: sampling time, and
n: occurrence of sampling On the other hand, since the transfer characteristics of the compensation circuit 46 can be described by Kr+Ks/S as set forth above, the compensation signal Ix can be illustrated by:

$$Ix(n) = ERKR(n) + IEX(n)$$

where
ERKR(n) = Kr × e(n)
IEX(n) = IEX(n−1) + (Ts/2) × Ks × {e(n−1) + e(n)}
Disregarding the first and second limiters 42 and 44, the torque current ITRM(n) to be input to the electric motor 41 can be illustrated by:

$$ITRM(n) = It(n) + Ix(n)$$

Here, the first limiter 42 is set a first limit value Liml and the second limiter 44 is set a second limit value Linl. Therefore, when the torque current It output from the motor speed controller 40 becomes greater than the first limit Liml, the first limiter 42 limits the values It(n) and EX(n) respectively to Liml and (Liml−KEN(n)). On the other hand, when the torque current ITRM(n) to be applied to the electric motor 41 becomes greater than the second limit Linl, the IEX(n) value is modified by (Linl−ERKR(n)−It(n)), and the torque current ITRM is set at Linl.

Figure 10:
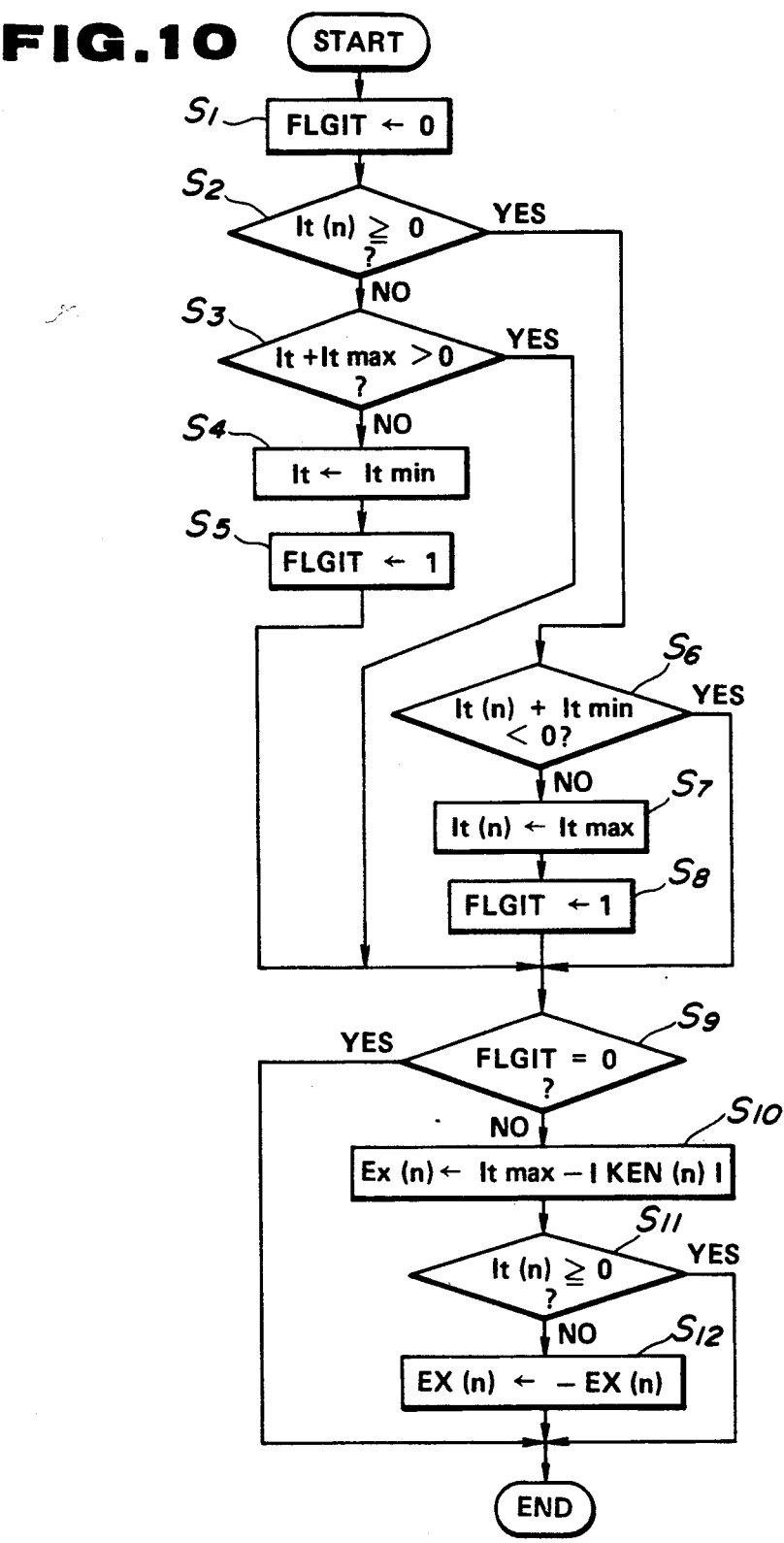
FIG. 10 is a flowchart of a first limiting operation to be performed by the third embodiment of a motor speed control system of FIG. 9.

FIG. 10 shows a process of operation of the first limiter 42. As will be seen from FIG. 10, an active first limiter indicative flag FLGIT is reset at a step S1. At a step S2, the torque current It(n) is checked whether it is greater than or equal to zero (0). When the torque current It(n) as checked at the step S2, is smaller than zero, check is performed whether (It+It$_{max}$ (It$_{max}$ is maximum torque current)) is greater than zero (0). When the (It+It$_{max}$) is smaller than or equal to zero, the torque current It(n) is set at a minimum torque current It$_{min}$, at a step S4. Thereafter, the active first limiter flag FLGIT is set at a step S5.

On the other hand, when the torque current It(n) is greater than or equal to zero as checked at the step S2, the value (It(n)+It$_{min}$) is checked whether it is smaller than zero, at a step S6. When the value (It(n)+It$_{min}$) is greater than or equal to zero, the torque current It(n) is set at the maximum torque current It$_{max}$, at a step S7. Then, the active first limiter flag FLGIT is set at a step S8.

After setting the active first limiter flag FLGIT at the step S5 or S8 or when the value (It+It$_{min}$) is greater than or equal to zero as checked at the step S3, the active first limiter flag FLGIT is checked at a step S9. When the flag FLGIT is not set as checked at the step S9, the EX(n) value is set in a value of (It$_{max}$−|KEN(n)|) at a step S10. Then, the torque current It(n) is checked whether it is greater than or equal to zero, at a step S11. When the torque current It(n) is smaller than zero as checked at the step S11, the sign of the EX(n) value is inverted to −EX(n) at a step S12.

After the step S12, when the active first limiter flag FLGIT is set as checked at the step S9, or when the torque current It(n) is greater than or equal to zero as checked at the step S11, process goes END.

Figure 11:
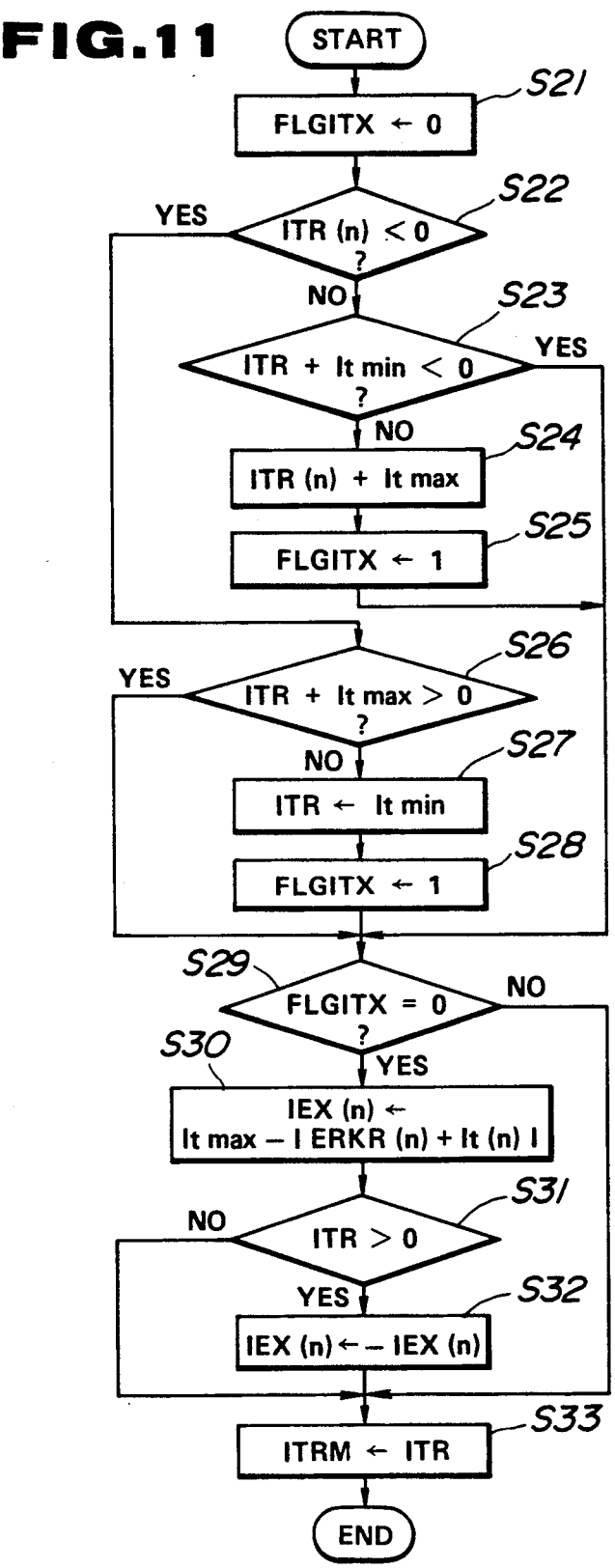
FIG. 11 is a flowchart of a second limiting operation to be performed by the third embodiment of a motor speed control system of FIG. 9.

FIG. 11 shows a process showing operation of the second limiter 44. Similarly to the foregoing operation of the first limiter 42, an active second limiter indicative flag FLGITX is reset at a step S21. The, the output value ITR(n) of the adder 43 is checked whether it is smaller than zero (0), at a step S22. When the ITR(n) value is greater than or equal to zero as checked at the step S22, a value (ITR(n)+It$_{min}$) is checked whether it is smaller than zero at a step S23. If the value (ITR(n)+It$_{min}$) is greater than or equal to zero as checked at the step S23, the value (ITR(n)+It$_{max}$) is set as the input current for the electric motor 41, at a step S24. Then, the active second limiter indicative flag FLGITX is set at a step S25.

On the other hand, when the ITR(n) value as checked at the step S22, is greater smaller than zero, a value (ITR(n)+It$_{max}$) is checked whether it is greater than zero at a step S26. When the value (ITR(n)+It$_{max}$) is smaller than or equal to zero as checked at the step S26, the ITR(n) value is set at the minimum current value It$_{min}$ at a step S27. Then, the active second limiter indicative flag FLGITX is set at a step S28.

After the process of the step S25 or the step S28, when the (ITR(n)+It$_{min}$) is smaller than zero as checked at the step S23 or when the value (ITR(n)+It$_{max}$) is greater than zero as checked at the step S26, the active second limiter indicative flag FLGITX is checked at a step S29. When the active second limiter indicative flag FLGITX is set as checked at the step S29, the IEX(n) value is calculated by:

$$IEX(n) = It_{max} - |ERKR(n) + It(n)|$$

at a step S30. Then, the ITR value is checked whether it is greater than zero at a step S31. When the ITR vaue is greater than zero as checked at the step S31, the sign of the IEX(n) value is inverted into −IEX(n) at a step S32.

After the step S32, when the active second limiter indicative flag FLGITX is set as checked at the step S29, or when the ITR value is smaller than or equal to zero as checked at the step S31, the ITR value is set as the ITRM value, at a step S33.

Figure 12:
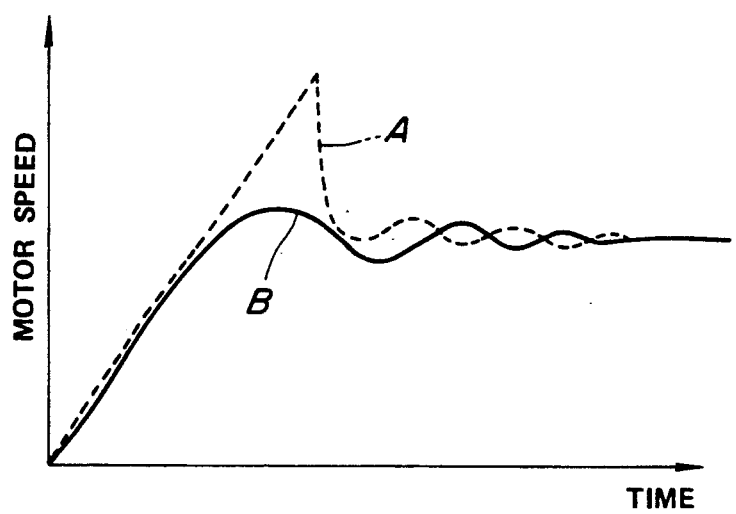
FIG. 12 is a chart showing variation of a motor revolution speed in relation to a time.

By this, response characteristics can be improved for providing smooth transition in motor speed variations as illustrated by line B in FIG. 12. The motor speed variation characteristics B as illustrated in FIG. 12, are compared with that of the conventional characteristics which are illustrated by the broken line.

Figure 13:
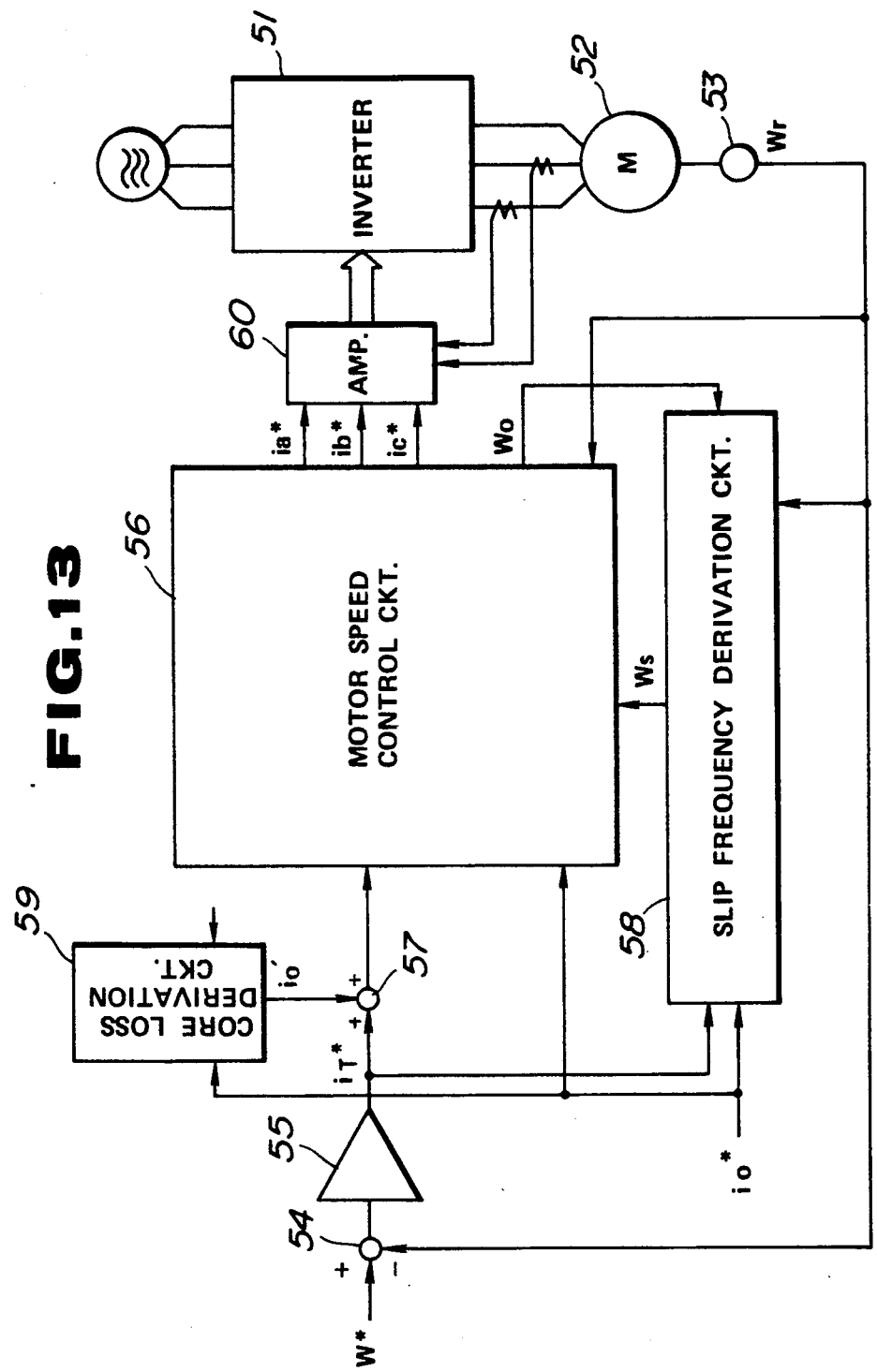
FIG. 13 is a block diagram of the fourth embodiment of a motor speed control system according to the present invention.

FIG. 13 shows the fourth embodiment of the motor speed control system according to the present invention. As will be appreciated, the shown embodiment employs vector control technology in controlling revolution speed of the electric motor. In the specific embodiment, a pulse-width-modulation (PWM) type inverter 51 is employed for controlling drive of an induction motor 52. The induction motor has a rotor, angular velocity ωr of which is monitored by means of a pick-up 53. The rotor angular velocity indicative output of the pick-up 53 is fed back to a subtractor 54, to which a motor speed command ω* is input. The subtractor 54 derives an error between the motor speed command ω* and the rotor angular velocity indicative signal ωr to input a speed error signal to a speed control amplifier 55 which comprises a proportional/integral (PI) amplifier. The speed control amplifier 55 outputs a torque current command i$_T$*. The torque current command i$_T$* is fed to a motor speed control circuits 56 via an adder 57. The motor speed control circuit 56 also receives the rotor angular velocity indicative signal ωr from the pick-up 53.

The torque current command i$_T$* of the speed control amplifier 55 is also fed to a slip frequency derivation circuit 58. To the slip frequency derivation circuit 58 also receives an excitation current command i$_o$* which is also fed to an core loss derivation circuit 59.

The motor speed control circuit 56 outputs a power source angular frequency indicative signal ω0 to the slip frequency derivation circuit 58 and to the core loss derivation circuit 59. The core loss derivation circuit 59 derives the core loss current indicative data Io' based on inputs to input the core loss indicative signal Io' to the adder 57. On the other hand, the slid frequency derivation circuit 58 derives a slip frequency indicative data ωs to input the motor speed control circuit 56.

The motor speed control circuit 56 derives current control signals ia*, ib* and ic* for commanding torque current for respective phase currents to be supplied to the induction motor 52. The current control signals ia*, ib* and ic* are fed to a current control amplifier 60 to control the inverter operation.

Here, it is assumed that the a primary current of an axis of flux of the induction motor 52 is i$_1$q, and a primary current of a torque azis which extends across the flux axis is i$_1$d. These primary currents i$_1$q and i$_1$d are illustrated respectively by:

$$i_1q = IO \text{ (constant)}$$

$$i_1d = -(I_T - I_o')$$

Furthermore, the slip frequency ωs can be described by:

$$\omega s = \{(R_2+Srm)/L_2\} \times (I_T^*/I_o^*) - (Srm/M) \times \{(I_T^* + I_o')/I_o\}$$

where
R₂ is secondary resistance,
S is slip = (ω0 − ωr)/ω0
rm is core loss resistance,
L₂ is secondary inductance, and
M is relative inductance.
$I_o' = (rm/\omega 0 M) \times I_o^*$ It should be appreciated that though the shown embodiment is described with taking the core loss resistance rm as fixed value, it can be arithmetically derived since the resistance rm is a function of a frequency.

The motor speed control circuit 56 performs arithmetic operation according to the following equations:

$$\omega 0 = \omega s + \omega r$$

$$|I_1| = \sqrt{I_T'^2 + I_o^{*2}}$$

$$\phi = \tan^{-1}(I_T'/I_o^*)$$

on the basis of the inputs, i.e. the torque current command $I_T'$ which is a sum value of the torque current command $I_T^*$ and the core loss current indicative data $I_o'$, the excitation current command $I_o^*$, the slip frequency ωs and the rotor angular velocity indicative data ωr. Based on these data, the current control signals ia*, ib* and ic* are derived by:

$$ia^* = \sqrt{2} \times |I_1| \times \sin(\omega 0 t + \phi)$$

$$ib^* = \sqrt{2} \times |I_1| \times \sin(\omega 0 t + \phi - 2/3 \times \pi)$$

$$ic^* = \sqrt{2} \times |I_1| \times \sin(\omega 0 t + \phi + 2/3 \times \pi)$$

These current control signals ia*, ib* and Ic* are used as torque current command for feedback controlling output current of the inverter 51.

It should be appreciated that, the shown embodiment, which employs core loss factor in deriving the torque current command, can be described by the following equation:

| $V_1d$ |   | $R_1 + rm + L_1P$ | $-\omega L_1$ | $MP$ | $-\omega M$ | $i_1d$ |
|---|---|---|---|---|---|---|
| $V_1q$ | = | $\omega L_1$ | $R_1 + rm + L_1P$ | $\omega M$ | $MP$ | $i_1q$ |
| 0 |   | $MP$ | $-\omega_s M$ | $R_2 + srm + L_2P$ | $-\omega_s L_2$ | $i_2d$ |
| 0 |   | $\omega_s M$ | $MP$ | $\omega_s L_2$ | $R_2 + srm + L_2P$ | $i_2q$ |

As will be appreciated herefrom, by the shown embodiment, since the torque current commands are derived with taking the core loss into account, influence by the core loss which otherwise degrades accuracy in non-interference control, can be avoided to provide for satisfactory accuracy in motor speed vector control.

Figure 14:
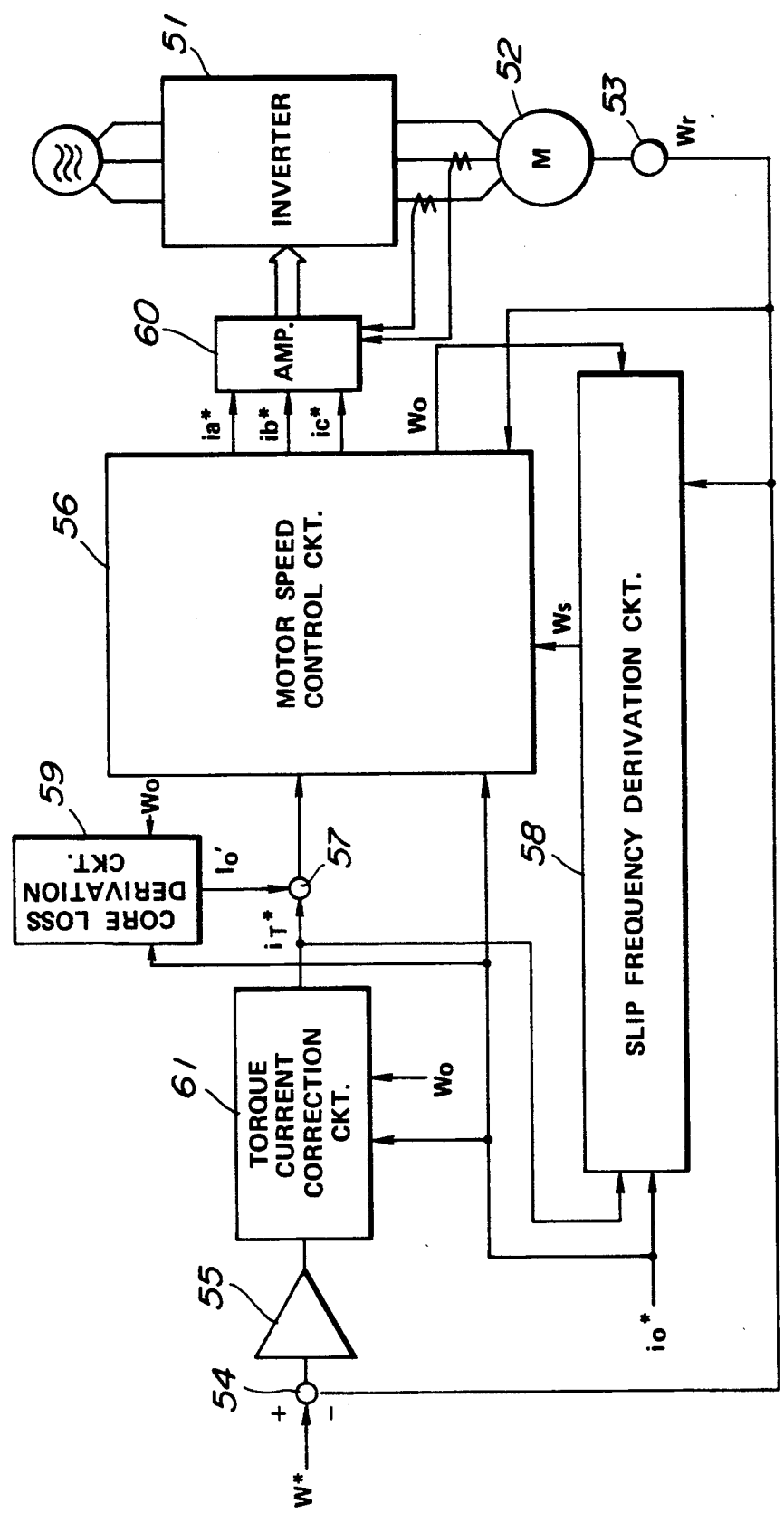
FIG. 14 is a block diagram of the fifth embodiment of a motor speed control system according to the present invention.

FIG. 14 shows the fifth embodiment of the motor speed control system according to the present invention. As will be seen from FIG. 14, the circuit construction of the shown fifth embodiment of the motor speed control system is essentially the same as that of the foregoing fourth embodiment of the motor speed control system except for a torque current correcting circuit 61. Therefore, the common circuit element to that of the foregoing fourth embodiment will be represented by the same reference numerals and detailed discussed thereabout will be neglected for simplification of the disclosure.

In the shown construction, the torque current correction circuit 61 is interposed between the speed control amplifier 55 and the adder 57. The torque current correction circuit 61 receives the excitation current command $i_o^*$ and the power source angular frequency indicative signal ω0 as well as the torque current command $i_T^*$ from the speed control amplifier 55. The torque current correction circuit 61 performs correction of the torque current command $i_T^*$ according to the following equation:

$$i_T^{*'} = (-B + \sqrt{B^2 + 4 \times (T/K_T) \times A})/2A$$

where
$A = (rmM^2/\omega L_2) \times \{(1/M) - (1/L_2)\}$,
$B = \{1 + (rm^2/\omega^2 M^2) \times (M^2/L_2)\} \times I_o$ Therefore, in the shown embodiment, the corrected torque current command $i_T^{*'}$ is processed in the motor speed control circuit 56 in place of the torque current command $i_T^*$.

Other control operations performed in the fifth embodiment of the motor speed control system of FIG. 14 is identical to that discussed with respect to the fourth embodiment of the motor speed control system. Therefore, it is not necessary to discuss again.

Figure 15:
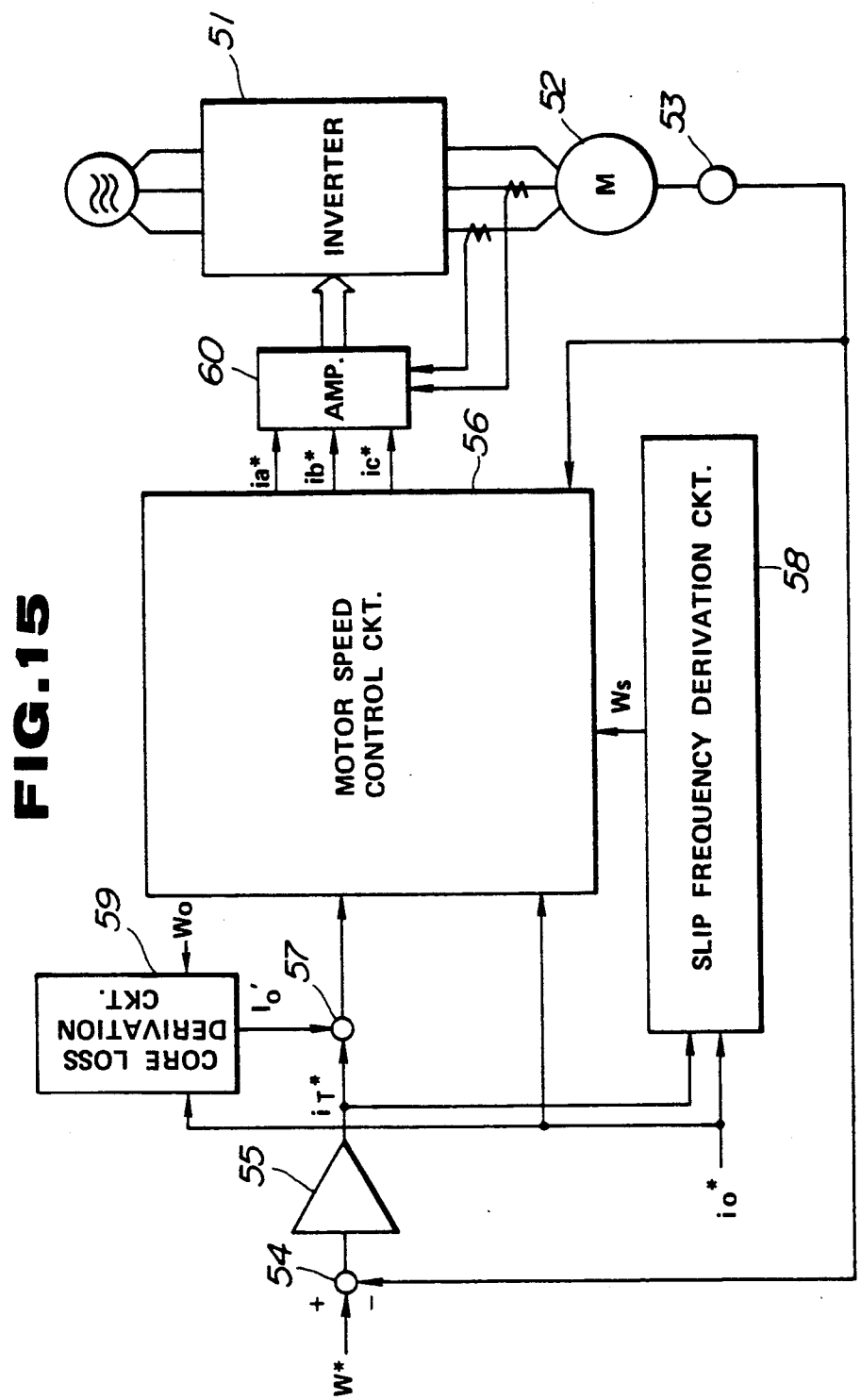
FIG. 15 is a block diagram of a modification of the fifth embodiment of a motor speed control system according to the present invention.

On the other hand, FIG. 15 shows a modification of the aforementioned fourth embodiment of the motor speed control system. In this modification, the slip frequency derivation circuit 58' is modified from that disclosed with respect to the fourth embodiment.

In the modified slid frequency derivation circuit 58', the slip frequency indicative data ωs is derived according to the following equation:

$$\omega s = (R_2/L_2) \times (I_T/I_o)$$

This modified circuit is useful when the core loss resistance in the slip frequency ωs can be ignored. In such case, the torque can be calculated by:

$$T = K_T \times (M^2/L_2) \times I_o \times I_1$$

Figure 16:
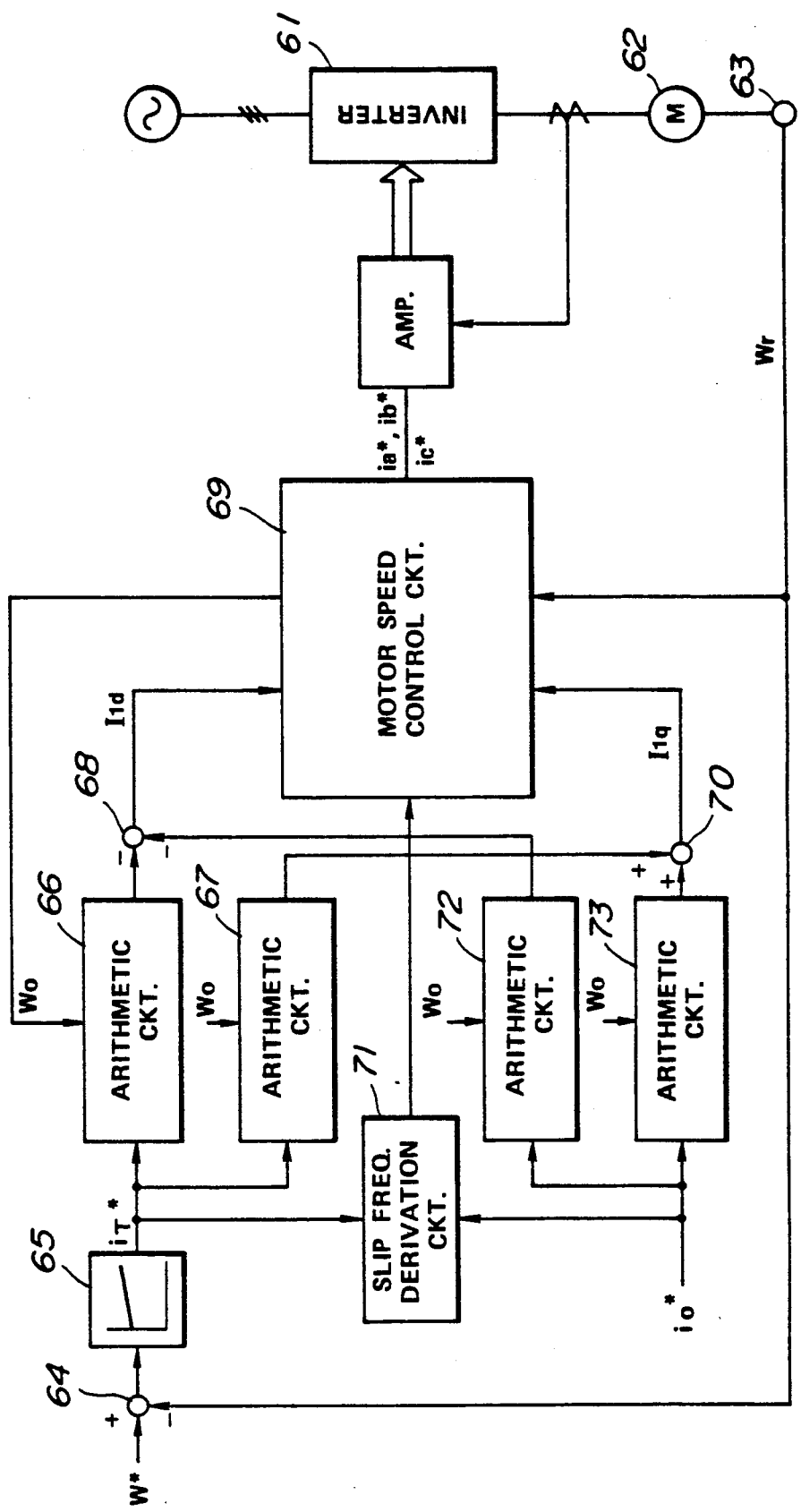
FIG. 16 is a block diagram of the sixth embodiment of a motor speed control system according to the present invention.

FIG. 16 shows a sixth embodiment of the motor speed control system, according to the invention.

Similarly, to the foregoing fourth and fifth embodiments, the shown embodiment is employs a vector control technology in controlling revolution speed of the electric motor. In the specific embodiment, a pulse-width-modulation (PWM) type inverter 61 is employed for controlling drive of an induction motor 62. The induction motor has a rotor, angular velocity ωr of which is monitored by means of a pick-up 63. The rotor angular velocity indicative output of the pick-up 63 is fed back to a subtractor 64, to which a motor speed command ω* is input. The subtractor 64 derives an error between the motor speed command ω* and the rotor angular velocity indicative signal ωr to input a speed error signal to a speed control amplifier 65 which comprises a proportional/integral (PI) amplifier. The speed control amplifier 65 outputs a torque current command $i_T^*$. The torque current command $i_T^*$ is fed to arithmetic circuits 66 and 67. The arithmetic circuit 66 is connected to an adder 68. The adder 68 is connected to a motor speed control circuit 69. On the other hand, the arithmetic circuit 67 is connected to an adder 70. The adder 70 is also connected to the motor speed control circuit 69. The motor speed control circuit 69 also receives the rotor angular velocity indicative signal ωr from the pick-up 63.

The torque current command $i_T^*$ of the speed control amplifier 65 is also fed to a slip frequency derivation circuit 71. To the slip frequency derivation circuit 71 also receives an excitation current command $i_o^*$ which is also fed to arithmetic circuits 72 and 73. The arithmetic circuit 72 is connected to the adder 68. On the other hand, the arithmetic circuit 73 is connected to the adder 70.

The motor speed control circuit 66 outputs a power source angular frequency indicative signal ω0 to the arithmetic circuits 66, 67, 72 and 73. The arithmetic circuit 66 performs arithmetic operation based on the torque current $i_T^*$ of the speed control amplifier 65 and the power source angular frequency indicative data ω0 according to the following equation:

$$i_{Ta} = \{(Rm^2 + \omega 0^2 ML_2)/(Rm^2 + \omega 0^2 M^2)\} \times I_T^*$$

Similarly, the arithmetic circuit 67 performs arithmetic operation based on the torque current $i_T^*$ and the power source angular frequency indicative data ω0, according to the following equation:

$$i_{Tb} = \{\omega 0 Rm(M - L_2)\}/(Rm^2 + \omega 0^2 M^2) \times i_T^*$$

The arithmetic circuit 73 performs arithmetic operation based on the excitation current command $I_o^*$ and the power source angular frequency indicative data ω0 according to the following equation:

$$I_o a = \{\omega 0^2 M^2/(Rm^2 + \omega 0^2 M^2)\} \times I_o^*$$

Similarly, the arithmetic circuit 72 performs arithmetic operation based on the torque current $I_o^*$ and the power source angular frequency indicative data ω0, according to the following equation:

$$I_o b = \{\omega 0 MRm/(Rm^2 + \omega 0^2 M^2)\} \times I_o^*$$

The adder 68 adds the $i_{Ta}$ and $I_o b$ to derive a current $I1_d$ and input the sum value to the motor speed control circuit 69. On the other hand, the adder 70 adds the $I_o a$ and $i_{Tb}$ to derive a current $I1_q$ and input to the sum value to the motor speed control circuit 69. The motor control circuit 69 derives the amplitude $|I_1|$, the phase angle φ, the power source angular frequency ω0 and current control signals ia*, ib* and ic*. The current control signals ia*, ib* and ic* are derived by:

$$ia^* = \sqrt{2} \times |I_1| \times \sin(\omega 0 t + \phi)$$

$$ib^* = \sqrt{2} \times |I_1| \times \sin(\omega 0 t + \phi - 2/3 \times \pi)$$

$$ic^* = \sqrt{2} \times |I_1| \times \sin(\omega 0 t + \phi + 2/3 \times \pi)$$

Therefore, by the shown embodiment, the equivalent advantages as can be obtained by the former fourth and fifth embodiments, can be obtained. In addition, the shown embodiment can simplify the process of arithmetic operations for deriving control currents. For instance, similarly to the foregoing embodiment, the following voltage equation is established with taking the core loss into account:

$$\begin{bmatrix} V_{1d} \\ V_{1q} \\ 0 \\ 0 \end{bmatrix} = \begin{bmatrix} R_1 + rm + L_1 P & -\omega L_1 & Rm & -\omega M \\ \omega L_1 & R_1 + Rm & \omega M & Rm \\ SRm & -\omega sM & R_2 + SRm & -\omega sL_2 \\ \omega sM & SRm & \omega sL_2 & R_2 + SRm \end{bmatrix} \begin{bmatrix} I1_d \\ I1_q \\ I2_d \\ I2_q \end{bmatrix}$$

Here, the secondary flux $\lambda 2_d$ and $\lambda 2_q$ and torque T are derived by the following equations:

$$\lambda 2_d = MI1_d + L_2 I2_d + (Rm/\omega) \times (I1_q + I2_q)$$

$$\lambda 2_q = MI1_q + L_2 I2_q + (Rm/\omega) \times (I1_d + I2_d)$$

$$T = K_T\{M(I2_d I1_q - I2_q I1_d) - (Rm/\omega) \times (I2_q I1_q + I2_q^2 + I2_d I1_d + I2_d^2)\}$$

Therefore, by the presence of the core loss resistance, d-axis flux $\lambda 2_d$ is influenced by q-axis current $I1_q$ and $I2_q$, and q-axis flux $\lambda 2_q$ is influenced by d-axis current $I1_d$ and $I2_d$. Furthermore, the torque T includes torque component generated by the core loss resistance Rm.

In order to avoid influence of the load to the secondary flux $\lambda 2_q$, $\lambda 2_q$ has to be constant. Therefore, the primary current $I1_q$ can be derived by:

$$I1_q = I_o + (m/\omega M) \times (I1_q + I2_d)$$

where $I_o$ is excitation current in no load condition (constant)

On the other hand, in order to make the torque proportional to the torque current $I_T$, the secondary current $I2_q$ has to be zero and the secondary flux $\lambda 2_d$ has to be one. From this, the primary current $I1_d$ is described by:

$$I1_d = -(L_2/M) \times I2_d - (Rm/\omega M) \times I1_d$$

According to the above, the primary current $I1_d$ can be derived by:

$$I1_d = -\{(Rm^2+\omega^2ML_2)/(Rm^2+\omega^2M^2)\}$$
$$\times I2_d - \{\omega MRm/(Rm^2+\omega^2M^2)\}\times I_o \quad (1)$$

On the other hand, the primary current $I1_q$ can be derived by:

$$I1_q=\{\omega^2M^2/(Rm^2+\omega^2M^2)\}\times I_o+\{(Rm\omega(M-L_2)/(Rm^2+\omega^2M^2)\}\times I2_d \quad (2)$$

By giving the foregoing condition, the following condition necessary for avoiding interference of the current and flux can be successfully established. Namely, by deriving the currents $I1_d$ and $I1_q$ on the basis of the excitation current $I_0$ and the torque current $I_T(I2_d)$, the magnitude of the secondary flux $\lambda 2_d$ and $\lambda 2_q$ and the torque satisfying the following condition can be obtained.

$$\lambda 2_d = 0;$$

$$\lambda 2_q = MI_0;\text{ and}$$

$$T = K_T \times M \times I_o \times I_T$$

In addition, the slip frequency $\omega s$ can be derived by:

$$\omega s = (R_2/M) \times (I_T/I_o)$$

As will be appreciated herefrom, the shown embodiment can perform precise control for the induction mode while taking the component of core loss into account.

Figure 19A:
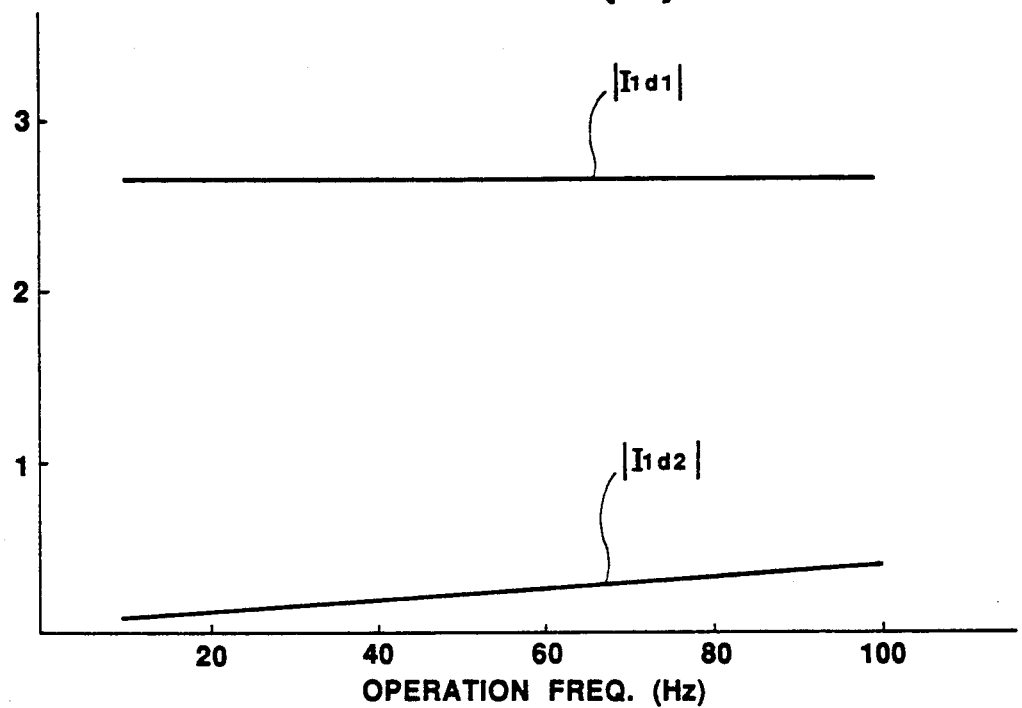
FIGS. 19(A) and 19(B) are graph showing variation of primary currents $I1_d$ and $I1_q$ in relation to operation frequency.
Figure 19B:
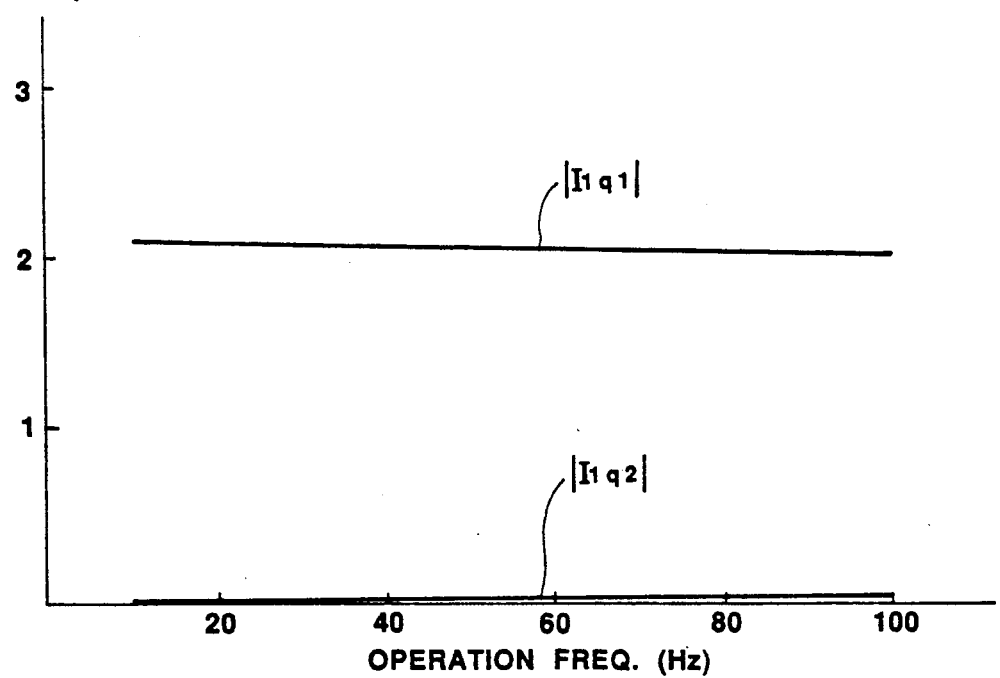

In the foregoing equations (1) and (2), under the following condition:
- rated output: 0.75 Kw−4P
- rated voltage: 200 V−50 Hz
- $L_2 = 0.16$ H
- $R_2 = 1.85 \Omega$
- $M = 0.153$ H
- $Rm = 6.15 \Omega$ The currents $I1_d$ and $I1_q$ may have frequency characteristics as illustrated in FIGS. 19(A) and 19(B). In FIG. 19(A), there are shown the absolute value of the first term $I1_{d1} = \{(-Rm^2+\omega^2ML_2)/(Rm^2+\omega^2M^2)\}\times I2_d$ and the absolute value of the second term $I1_{d2} = \{\omega MRm/(Rm^2+\omega^2M^2)\}\times I_o$ of the equation (1). Similarly, FIG. 19(B) shows variation of the absolute value of the first term $I1_{q1}=\{\omega^2M^2/(Rm^2+\omega^2M^2)\}\times I_o$ and the second term $I1_{q2}\{Rm\omega(M-L_2)/(Rm^2+\omega^2M^2)\}\times I2_d$. As seen from the characteristics as shown in FIGS. 19(A) and 19(B), it should be appreciated that the first term $I1_{d1}$ of the equation (1) is held constant irrespective of variation of the frequency $\omega$ and will not cause substantial change in response to the core loss. On the other hand, the second term $I1_{q2}$ of the equation (2) can be ignored. In comparison with the first term $I1_{q1}$ of the equation (2), the second term $I1_{d2}$ of the equation (1) subject greater influence.

Therefore, with taking the fact set forth above into account, the foregoing equations (1) and (2) can be modified as follows:

$$I1_d = -(L_2/M)\times I_T{}^* - \{\omega MRm/(Rm^2+\omega^2M^2)\}\times I_o{}^* \quad (3)$$

$$I1_q = -\{\omega^2M^2/(Rm^2+\omega^2M^2)\}\times I_o{}^* \quad (4)$$

Figure 17:
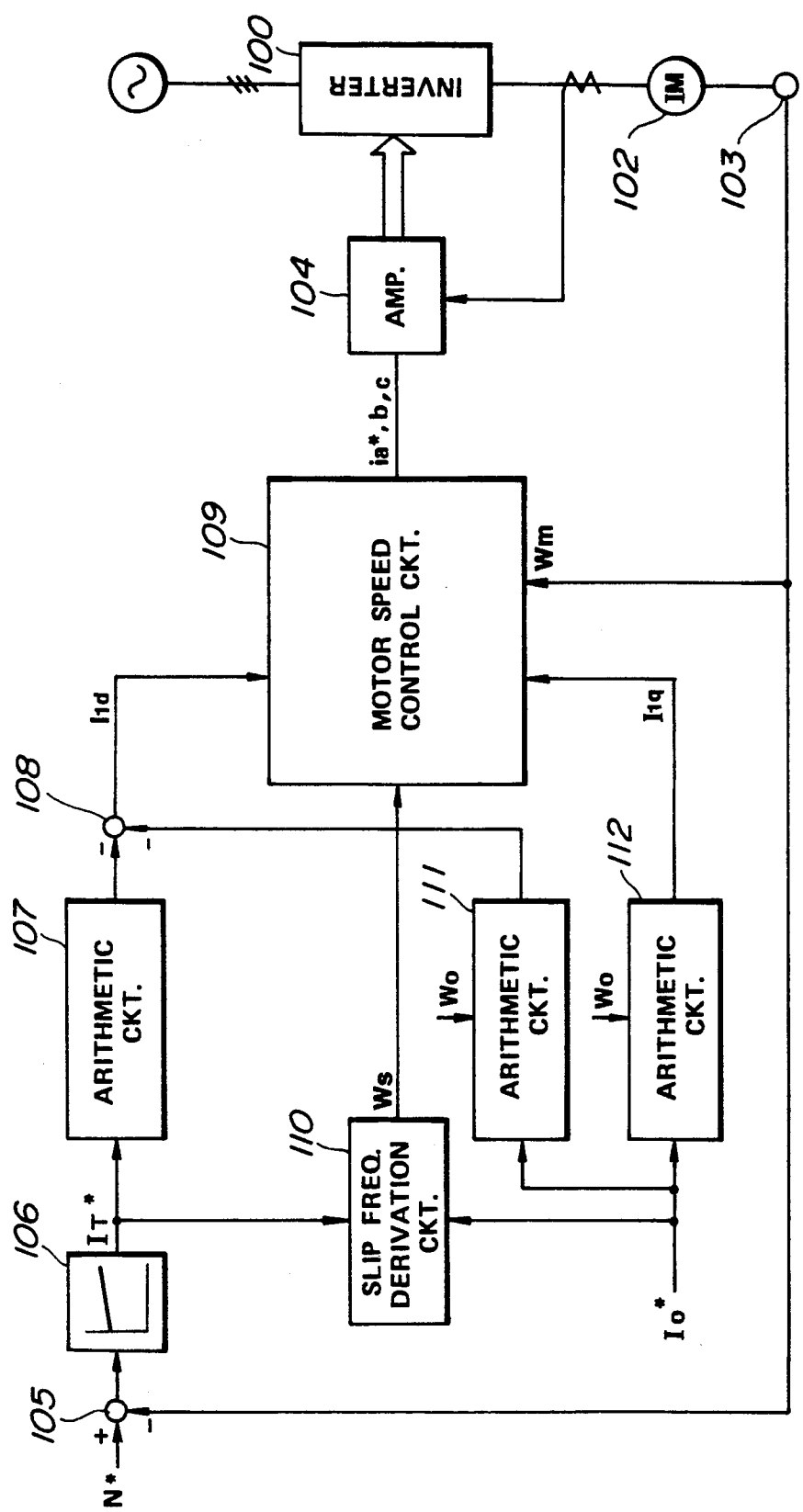
FIG. 17 is a block diagram of the seventh embodiment of a motor speed control system according to the present invention.

FIG. 17 shows the seventh embodiment of the motor speed control system according to the present invention, which implements the motor speed control according to the foregoing simplified equation.

In the shown embodiment, the pulse-width-modulation (PWM) type inverter 100 is employed for controlling drive of an induction motor 102. The induction motor has a rotor, angular velocity $\omega r$ of which is monitored by means of a pick-up 103. The rotor angular velocity indicative output of the pick-up 103 is fed back to a subtractor 105, to which a motor speed command N* is input. The subtractor 105 derives an error between the motor speed command N* and the rotor angular velocity indicative signal $\omega r$ to input a speed error signal to a speed control amplifier 106 which comprises a proportional/integral (PI) amplifier. The speed control amplifier 106 outputs a torque current command $i_T{}^*$. The torque current command $i_T{}^*$ is fed to arithmetic circuit 107. The arithmetic circuit 107 is connected to an adder 108. The adder 108 is connected to a motor speed control circuit 109.

The torque current command $i_T{}^*$ of the speed control amplifier 106 is also fed to a slip frequency derivation circuit 110. To the slip frequency derivation circuit 110 also receives an excitation current command $i_o{}^*$ which is also fed to arithmetic circuits 111 and 112. The arithmetic circuit 111 is connected to the adder 108. On the other hand, the arithmetic circuit 112 is connected to the motor speed control circuit 109.

The motor speed control circuit 109 outputs a power source angular frequency indicative signal $\omega 0$ to the arithmetic circuits 107, 111 and 112. The arithmetic circuit 107 performs arithmetic operation based on the torque current $i_T{}^*$ of the speed control amplifier 109 and the power source angular frequency indicative data $\omega 0$ according to the following equation:

$$i_{T}a = (L_2/M)\times I_T{}^*$$

Similarly, the arithmetic circuit 111 performs arithmetic operation based on the torque current $i_T{}^*$ and the power source angular frequency indicative data $\omega 0$, according to the following equation:

$$i_{T}b = \{\omega 0 Rm(M-L_2)\}/(Rm^2+\omega 0^2 M^2)\times i_T{}^*$$

The arithmetic circuit 112 performs arithmetic operation based on the excitation current command $I_o{}^*$ and the power source angular frequency indicative data $\omega 0$ according to the following equation:

$$I_o a = \omega 0^2 M^2/(Rm^2+\omega 0^2 M^2)\times I_o{}^*$$

Similarly, the arithmetic circuit 72 performs arithmetic operation based on the torque current $I_o{}^*$ and the power source angular frequency indicative data $\omega 0$, according to the following equation:

$$I_o b = \omega 0 MRm/(Rm^2+\omega 0^2 M^2)\times I_o{}^*$$

The adder 108 adds the $i_Ta$ and $I_ob$ to derive a current $I1_d$ and input the sum value to the motor speed control circuit 109. The arithmetic circuit 112 is connected to the motor speed control circuit 109. The motor control circuit 109 derives the amplitude $|I_1|$, the phase angle $\phi$, the power source angular frequency $\omega 0$ and current control signals ia*, ib* and ic*.

As will be appreciated with utilizing the equations (3) and (4), the circuit construction can be substantially simplified in comparison with that of the foregoing sixth embodiment without causing substantial degradation of precision.

Further simplification of the equation and circuit construction can be achieved by providing that $I1_q$ is equal to $I_o^*$.

Figure 18:
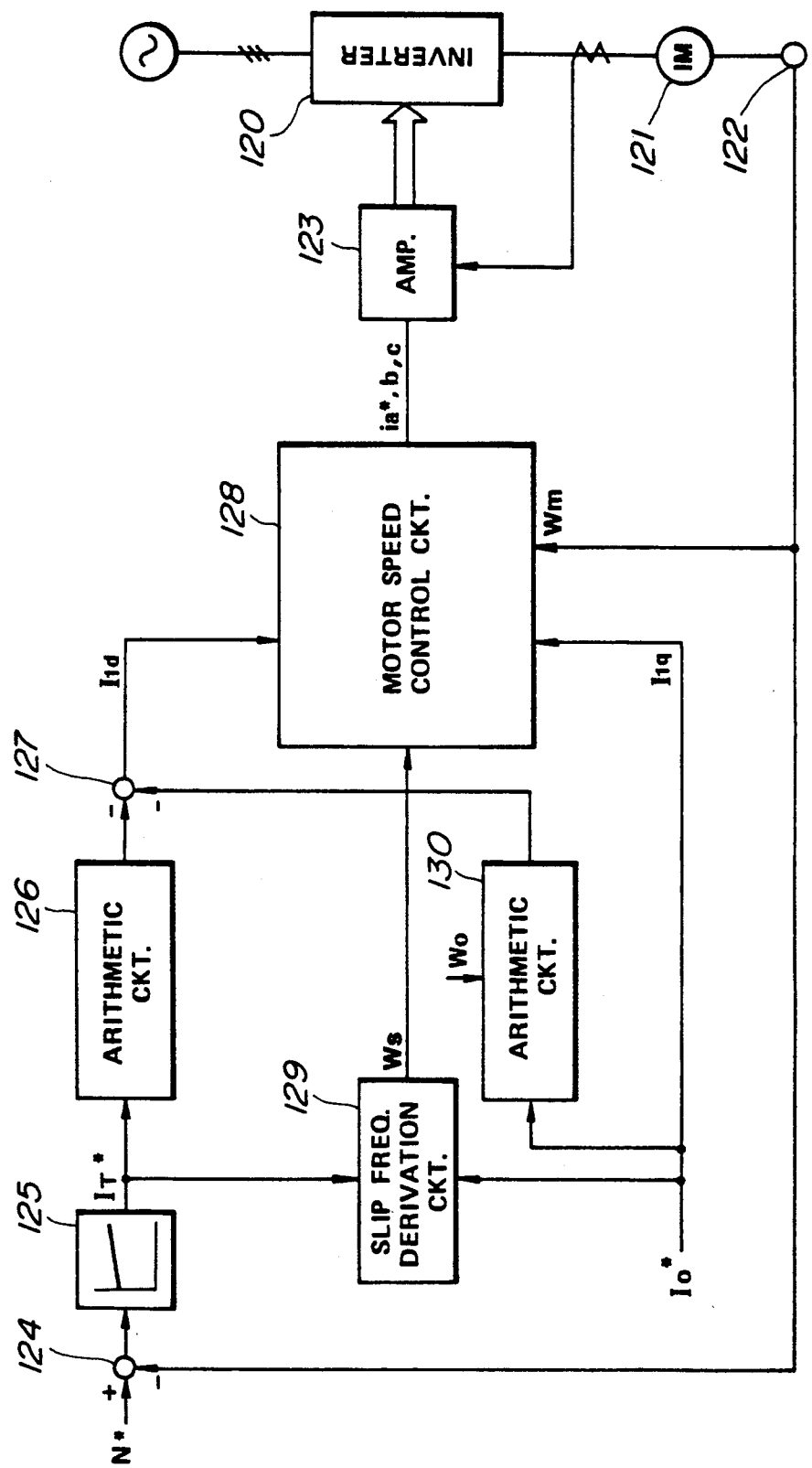
FIG. 18 is a block diagram of the eighth embodiment of a motor speed control system according to the present invention.

FIG. 18 shows the eighth embodiment of the motor speed control system according to the present invention, which implements the motor speed control achieving further simplification.

In the shown embodiment, the pulse-width-modulation (PWM) type inverter 120 is employed for controlling drive of an induction motor 121. The induction motor 121 has a rotor, angular velocity $\omega r$ of which is monitored by means of a pick-up 122. The rotor angular velocity indicative output of the pick-up 122 is fed back to a subtractor 124, to which a motor speed command $N^*$ is input. The subtractor 105 derives an error between the motor speed command $N^*$ and the rotor angular velocity indicative signal $\omega r$ to input a speed error signal to a speed control amplifier 125 which comprises a proportional/integral (PI) amplifier. The speed control amplifier 125 outputs a torque current command $i_T^*$. The torque current command $i_T^*$ is fed to arithmetic circuit 107. The arithmetic circuit 126 is connected to an adder 127. The adder 108 is connected to a motor speed control circuit 128.

The torque current command $i_T^*$ of the speed control amplifier 125 is also fed to a slip frequency derivation circuit 129. To the slip frequency derivation circuit 129 also receives an excitation current command $i_o^*$ which is also fed to arithmetic circuit 130. The arithmetic circuit 130 is connected to the adder 127.

The motor speed control circuit 125 outputs a power source angular frequency indicative signal $\omega 0$ to the arithmetic circuits 126 and 130. The arithmetic circuit 126 performs arithmetic operation based on the torque current $i_T^*$ of the speed control amplifier 125 and the power source angular frequency indicative data $\omega 0$ according to the following equation:

$$i_{Ta} = (L_2/M) \times I_T^*$$

Similarly, the arithmetic circuit 130 performs arithmetic operation based on the torque current $i_T^*$ and the power source angular frequency indicative data $\omega 0$, according to the following equation:

$$i_{Tb} = \{\omega 0 Rm(M-L_2)\}/(Rm^2 + \omega 0^2 M^2) \times i_T^*$$

Similarly, the arithmetic circuit 72 performs arithmetic operation based on the torque current $I_o^*$ and the power source angular frequency indicative data $\omega 0$, according to the following equation:

$$I_o b = \{\omega 0 M Rm/(Rm^2 + \omega 0^2 M^2)\} \times I_o^*$$

The adder 127 adds the $i_{Ta}$ and $I_o b$ to derive a current $I1_d$ and input the sum value to the motor speed control circuit 128. The motor control circuit 128 derives the amplitude $|I_1|$, the phase angle $\phi$, the power source angular frequency $\omega 0$ and current control signals $ia^*$, $ib^*$ and $ic^*$.

As will be appreciated by modifying the forgoing equarion (4) as $I1_q = I_o^*$, substantial simplification of the circuit construction can be achieved with acceptable level of precision.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A motor speed control system comprising:
   first means for generating a torque current for driving an electric motor at a revolution speed corresponding to the magnitude of said torque current;
   second means for producing a motor speed indicative signal representative of a revolution speed of said electric motor;
   third means, provided equivalent characteristics to that of said electric motor and connected to said first means for receiving said torque current, for generating a first reference speed indicative signal representative of a revolution speed of said electric motor corresponding to the input torque current;
   fourth means, receiving said first reference signal, for deriving a difference between said first reference signal value and a desired motor speed representative value for controlling said first means for reducing the difference between said first reference signal value and said desired motor speed representative value to zero; and
   fifth means interposed between said first means and one of said electric motor and said third means, for limiting said torque current to be supplied to at least one of said electric motor and said third means within a predetermined range.

2. A motor speed control system as set forth in claim 1, wherein said fifth means comprises a first limiter interposed between said first means and said third means for limiting said torque current to be supplied to said third means within a first given range and a second limiter interposed between said first means and said electric motor for limiting torque current to be supplied to said electric motor within a second given range.

3. A motor speed control system as set forth in claim 2, wherein said second limiter is provided between said first limiter and said electric motor.

4. A motor speed control system as set forth in claim 1, which further comprises:
   a sixth means receiving said motor speed indicative signal and said first reference speed indicative signal for deriving a difference between said motor speed indicative signal value and said first reference speed indicative signal value to produce a speed error signal; and
   seventh means, responsive to said speed error signal, for deriving a compensation signal based on said speed error signal for modifying said torque current for compensating said speed error between said motor speed indicative signal value and said sum value.

5. A motor speed control system as set forth in claim 4, which further comprises:
   eighth means for generating a known frequency of a frequency signal which is to be added to said torque current for driving said electric motor with a modified torque current;
   ninth means, provided equivalent characteristics to that of said electric motor and connected to said eighth means for receiving said frequency signal, for generating a second reference speed indicative signal representative of a revolution speed of said electric motor corresponding to the input frequency signal;

said sixth means receiving said motor speed indicative signal, said first reference speed indicative signal and said second reference speed indicative signal, for deriving a difference between said motor speed indicative signal value and a sum value of said first and second reference speed indicative signal values to produce a speed error signal;

tenth means, receiving said speed error signal and said frequency signal, for deriving an inertia representative data representative of an assumed inertia moment on said electric motor, and correcting a transfer characteristics of at least one of circuit components in such a manner that the inertia dependent factor in said fourth means becomes coincidence with that of said electric motor.

6. A motor speed control system comprising:

first means for generating a basic torque current for driving an electric motor at a revolution speed corresponding to the magnitude of said torque current;

second means for producing a motor speed indicative signal representative of a revolution speed of said electric motor;

third means for generating a known frequency of a frequency signal which is to be added to said basic torque current for driving said electric motor with a modified torque current;

fourth means, provided equivalent characteristics to that of said electric motor and connected to said first means for receiving said torque current, for generating a first reference speed indicative signal representative of a revolution speed of said electric motor corresponding to the input torque current;

fifth means, provided equivalent characteristics to that of said electric motor and connected to said third means for receiving said frequency signal, for generating a second reference speed indicative signal representative of a revolution speed of said electric motor corresponding to the input frequency signal;

sixth means, receiving said first reference signal, for deriving a difference between said first reference signal value and a desired motor speed representative value for controlling said first means for reducing the difference between said first reference signal value and said desired motor speed representative value to zero;

seventh means receiving said motor speed indicative signal, said first reference speed indicative signal and said second reference speed indicative signal, for deriving a difference between said motor speed indicative signal value and a sum value of said first and second reference speed indicative signal values to produce a speed error signal;

eighth means, responsive to said speed error signal, for deriving a compensation signal based on said speed error signal value for modifying said torque current for compensating said speed error between said motor speed indicative signal value and said sum value; and ninth means, receiving said speed error signal and said frequency signal, for deriving an inertia representative data representative of an assumed inertia moment on said electric motor, and correcting a transfer characteristics of at least one of circuit components in such a manner that an inertia dependent factor in said fourth means becomes coincident with that of said electric motor.

7. A motor speed control system as set forth in claim 6, wherein said ninth means further modifies transfer characteristics of at least one of said circuit components for maintaining a transfer function of an overall motor speed controlling loop constant.

8. A motor speed control system as set forth in claim 6, wherein said third means is so designed as to produce said frequency signal which has a signal value variation characteristics to have an average value zero.

9. A motor speed control system as set forth in claim 6, wherein said third means is so designed as to produce said frequency signal which has a signal value variation characteristics, in which an integrated value becomes zero.

10. A motor speed control system as set forth in claim 6, wherein said fourth and fifth means have first and second transfer elements having variable transfer characteristics, said first and second transfer elements of said fourth and fifth means being adjusted so that the transfer characteristics reduce said speed error signal value to zero on the basis of said inertia representative data of said ninth means.

11. A motor speed control system as set forth in claim 10, wherein said sixth means includes a third transfer element which can vary transfer characteristics depending on said inertia representative data, said transfer characteristics of said third transfer element being adjusted so as to maintain a transfer function of an overall speed control loop constant.

12. A motor speed control system as set forth in claim 6, which further comprises a transfer element which can vary transfer characteristics depending upon said inertia representative data for adjusting the modified torque current to be supplied to said electric motor so as to compensate the difference of inertia factors in said electric motor and said fourth means.

13. A motor speed control system for an induction motor, comprising:

said induction motor;

a motor driving circuit for applying power to drive the motor, a sensor means associated with said induction motor, for monitoring a revolution speed thereof and producing a motor speed indicative signal; and a vector controlling means for controlling a flux-axis primary current $I1_q$, a torque-axis primary current $I1_d$ and slip frequency $\omega s$ to establish the following condition:

$$I1_q = I_o \text{ (constant)};$$

$$I1_d = -(I_T + I_o'); \text{ and}$$

$$\omega s = (R_2 + Srm)/L_2 \times I_T/I_o - Srm/M \times \{(I_T + I_o')/I_o\}$$

where $I_o$ is a set excitation current value;
$I_T$ is a set torque current value;
$I_o'$ is a core loss current value;
$R_2$ is a secondary resistance;
$S$ is a slip;
$rm$ is a core loss resistance;
$L_2$ is a secondary inductance; and
$M$ is a relative inductance.

14. A motor speed control system as set forth in claim 13, wherein said vector controlling means corrects said set torque current value $I_T$ based on a torque command T to establish the following equation:

$$i_T = (-B + \sqrt{B^2 + 4 \times T/Kr \times A})/2A$$

where
$A = rmM^2/\omega L_2 \times (1/M - 1/L_2)$,
$B = (1 + rm^2/\omega^2 M^2) \times M^2/L_2 \times I_o$ 15. A motor speed control system for an induction motor, comprising:
    said induction motor;
    a motor driving circuit for applying power to drive the motor,
    a sensor means associated with said indication motor, for monitoring a revolution speed thereof and producing a motor speed indicative signal; and
    a vector controlling means for controlling a flux-axis primary current $I1_q$, a torque-axis primary current $I1_d$ and slip frequency $\omega s$ to establish the following condition:

$$I1_d = -\{(Rm^2 + \omega^2 ML_2)/(Rm^2 + \omega^2 M^2)\} \times I_T^* - \{\omega MRm/(Rm^2 + \omega^2 M^2)\} \times I_o^*$$

$$I1_q = \{\omega^2 M^2/(Rm^2 + \omega^2 M^2)\} \times I_o^* + \{(Rm\omega(M - L_2)/(Rm^2 + \omega^2 M^2)\} \times I_T^*$$

$$\omega s = (R_2/M) \times (I_T^*/I_o^*)$$

where
M is a relative inductance;
$L_2$ is a secondary inductance;
$R_2$ is a secondary resistance;
$\omega$ is a power source angular frequency;
$I_T^*$ is torque current command;
$I_o^*$ is excitation current command; and
Rm is core loss resistance.

16. A motor speed control system for an induction motor, comprising:
    said induction motor;
    a motor driving circuit for applying power to drive the motor,
    a sensor means associated with said indication motor, for monitoring a revolution speed thereof and producing a motor speed indicative signal; and
    a vector controlling means for controlling a flux-axis primary current $I1_q$, a torque-axis primary current $I1_d$ and slip frequency $\omega s$ to establish the following condition:

$$I1_d = -(L_2/M) \times I_T^* - \{\omega MRm/(Rm^2 + \omega^2 M^2)\} \times I_o^*$$

$$I1_q = -\{\omega^2 M^2/(Rm^2 + \omega^2 M^2)\} \times I_o^*$$

$$\omega s = (R_2/M) \times (I_T^*/I_o^*)$$

where
M is a relative inductance;
$L_2$ is a secondary inductance;
$R_2$ is a secondary resistance;
$\omega$ is a power source angular frequency;
$I_T^*$ is torque current command;
$I_o^*$ is excitation current command; and
Rm is core loss resistance.

17. A motor speed control system for an induction motor, comprising:
    said induction motor;
    a motor driven circuit for applying power to drive the motor,
    a sensor means associated with said indication motor, for monitoring a revolution speed thereof and producing a motor speed indicative signal; and
    a vector controlling means for controlling a flux-axis primary current $I1_q$, a torque-axis primary current $I1_d$ and slip frequency $\omega s$ to establish the following condition:

$$I1_d = -(L_2/M) \times I_T^* - (\omega MRm/(Rm^2 + \omega^2 M^2)) \times I_o^*$$

$$I1_q = I_o^* \omega s = (R_2/M) \times (I_T^*/I_o^*)$$

where
M is a relative inductance;
$L_2$ is a secondary inductance;
$R_2$ is a secondary resistance;
$\omega$ is a power source angular frequency;
$I_T^*$ is torque current command;
$I_o^*$ is excitation current command; and
Rm is core loss resistance.

* * * * *